(12) United States Patent
Dowling

(10) Patent No.: US 7,277,424 B1
(45) Date of Patent: *Oct. 2, 2007

(54) METHOD AND APPARATUS FOR CO-SOCKET TELEPHONY

(76) Inventor: Eric M. Dowling, 1132 W. Lookout Dr., Richardson, TX (US) 75080

( * ) Notice: Subject to any disclaimer, the term of this patent is extended or adjusted under 35 U.S.C. 154(b) by 431 days.

This patent is subject to a terminal disclaimer.

(21) Appl. No.: 10/780,350

(22) Filed: Feb. 16, 2004

Related U.S. Application Data

(63) Continuation of application No. 09/120,499, filed on Jul. 21, 1998, now Pat. No. 6,714,536.

(51) Int. Cl.
*H04L 12/66* (2006.01)
(52) U.S. Cl. .................. 370/352; 370/356; 370/466
(58) Field of Classification Search ............... None
See application file for complete search history.

(56) References Cited

U.S. PATENT DOCUMENTS

| | | | |
|---|---|---|---|
| 5,081,707 A | 1/1992 | Schorman et al. |
| 5,313,582 A | 5/1994 | Hendel et al. |
| 5,365,451 A | 11/1994 | Wang |
| 5,392,390 A | 2/1995 | Crozler |
| 5,416,473 A | 5/1995 | Dulaeny |
| 5,416,842 A | 5/1995 | Fleming |
| 5,436,960 A | 7/1995 | Campane, Jr. et al. |
| 5,479,472 A | 12/1995 | Campane, Jr. et al. |
| 5,479,491 A | 12/1995 | Herrero Garcia et al. |
| 5,487,100 A | 1/1996 | Kane |
| 5,561,704 A | 10/1996 | Sallmando |
| 5,565,874 A | 10/1996 | Rode et al. |
| 5,570,417 A | 10/1996 | Byers |
| 5,572,528 A | 11/1996 | Shuen et al. |
| 5,603,054 A | 2/1997 | Theimer et al. |
| 5,608,786 A | 3/1997 | Gordon |
| 5,612,730 A | 3/1997 | Lewis |
| 5,627,549 A | 5/1997 | Park |
| 5,675,507 A | 10/1997 | Bobo |
| 5,689,825 A | 11/1997 | Averbuch et al. |
| 5,724,412 A | 3/1998 | Srinivasan |
| 5,737,414 A | 4/1998 | Walker et al. |
| 5,742,906 A | 4/1998 | Foladare et al. |

(Continued)

OTHER PUBLICATIONS

WAP Architecture Version Apr. 30, 1998—Wireless Application Protocol Architecture Specification (20 pages).

(Continued)

*Primary Examiner*—Chirag G. Shah
(74) *Attorney, Agent, or Firm*—Eric M. Dowling

(57) ABSTRACT

Methods and apparatus for allowing a packet data connection to be established by sending an indication of a network address through a telephony path. In a first embodiment, a protocol stack initiates the establishment of an Internet connection by sending a data segment through a public switched telephone network (PSTN) telephony path and then operates and maintains the Internet connection on separate packet connection. Dialing digits are used to indicate the address of a remote computer or wireless device via the telephony path. The invention also enables mixed PSTN/internet multimedia telephone calls. In an exemplary embodiment, when a point-to-point telephone PSTN connection is established, a screen of information automatically appears at one or both ends of the connection via the Internet.

120 Claims, 15 Drawing Sheets

U.S. PATENT DOCUMENTS

| | | |
|---|---|---|
| 5,745,556 A | 4/1998 | Ronen |
| 5,745,695 A | 4/1998 | Gilchrist et al. |
| 5,745,702 A | 4/1998 | Morozumi |
| 5,754,786 A | 5/1998 | Diaz et al. |
| 5,767,795 A | 6/1998 | Schephorat |
| 5,771,353 A | 6/1998 | Eggleston et al. |
| 5,790,642 A | 8/1998 | Taylor et al. |
| 5,796,728 A | 8/1998 | Rondeau et al. |
| 5,809,118 A | 9/1998 | Carmello et al. |
| 5,809,415 A | 9/1998 | Rossmann |
| 5,812,776 A | 9/1998 | Gifford |
| 5,819,046 A | 10/1998 | Johnson |
| 5,825,854 A | 10/1998 | Larson |
| 5,838,682 A | 11/1998 | Dekelbaum |
| 5,862,339 A | 1/1999 | Bonnaure et al. |
| 5,864,764 A | 1/1999 | Thro et al. |
| 5,867,110 A | 2/1999 | Naito et al. |
| 5,887,254 A | 3/1999 | Halonen |
| 5,889,845 A | 3/1999 | Staples |
| 5,898,680 A | 4/1999 | Johnstone et al. |
| 5,900,825 A | 5/1999 | Pressel et al. |
| 5,907,811 A | 5/1999 | Foladare et al. |
| 5,941,946 A | 8/1999 | Baldwin |
| 5,949,776 A | 9/1999 | Mahany et al. |
| 5,959,577 A | 9/1999 | Fan et al. |
| 5,961,590 A | 10/1999 | Mendez et al. |
| 5,987,062 A | 11/1999 | Engwer et al. |
| 6,005,926 A | 12/1999 | Mashinsky |
| 6,023,708 A | 2/2000 | Mendez et al. |
| 6,029,141 A | 2/2000 | Bezos et al. |
| 6,035,104 A | 3/2000 | Zaharlev |
| 6,061,565 A | 5/2000 | Innes et al. |
| 6,073,155 A | 6/2000 | Narasimhan et al. |
| 6,085,192 A | 7/2000 | Mendez et al. |
| 6,101,531 A | 8/2000 | Eggleston et al. |
| 6,115,754 A | 9/2000 | Landgren |
| 6,131,121 A | 10/2000 | Mattaway |
| 6,134,432 A | 10/2000 | Holmes et al. |
| 6,151,606 A | 11/2000 | Mendez |
| 6,154,212 A | 11/2000 | Erick et al. |
| 6,154,461 A | 11/2000 | Sturniolo et al. |
| 6,175,589 B1 | 1/2001 | Cummings |
| 6,185,204 B1 | 2/2001 | Voit |
| 6,185,205 B1 | 2/2001 | Sharrit et al. |
| 6,185,210 B1 | 2/2001 | Troxel |
| 6,196,846 B1 | 3/2001 | Berger et al. |
| 6,199,045 B1 | 3/2001 | Giniger et al. |
| 6,201,962 B1 | 3/2001 | Sturniolo |
| 6,219,694 B1 | 4/2001 | Lazeridia |
| 6,258,498 B1 | 7/2001 | Ludwig |
| 6,269,402 B1 | 7/2001 | Lin et al. |
| 6,289,464 B1 | 9/2001 | Wecker et al. |
| 6,298,120 B1 | 10/2001 | Civanlar et al. |
| 6,324,279 B1 | 11/2001 | Kalmanek et al. |
| 6,359,880 B1 | 3/2002 | Curry et al. |
| 6,359,881 B1 | 3/2002 | Gerszberg et al. |
| 6,366,650 B1 | 4/2002 | Rhie |
| 6,404,861 B1 | 6/2002 | Cohen et al. |
| 6,421,707 B1 | 7/2002 | Miller et al. |
| 6,463,051 B1 | 10/2002 | Ford |
| 6,473,423 B1 | 10/2002 | Tebeka |
| 6,483,912 B1 | 11/2002 | Kalmanek et al. |
| 6,487,200 B1 | 11/2002 | Fraser |
| 6,498,797 B1 | 12/2002 | Anerousis et al. |
| 6,522,875 B1 | 2/2003 | Dowling et al. |
| 6,535,493 B1 | 3/2003 | Lee et al. |
| 6,542,489 B1 | 4/2003 | Kari et al. |
| 6,546,261 B1 | 4/2003 | Cummings |
| 6,549,612 B2 | 4/2003 | Gifford |
| 6,556,586 B1 | 4/2003 | Sipila |
| 6,563,914 B2 | 5/2003 | Sammon |
| 6,571,290 B2 | 5/2003 | Selgas |
| 6,574,239 B1 | 6/2003 | Dowling et al. |
| 6,594,692 B1 | 7/2003 | Reisman |
| 6,600,734 B1 | 7/2003 | Gemet et al. |
| 6,680,700 B2 | 8/2003 | Pinnard et al. |
| 6,639,550 B2 | 10/2003 | Knockeart |
| 6,643,684 B1 | 11/2003 | Malkin et al. |
| 6,654,348 B1 * | 11/2003 | Doty et al. ................ 370/244 |
| 6,654,786 B1 | 11/2003 | Fox et al. |
| 6,690,654 B2 | 2/2004 | Elliott |
| 6,707,811 B2 | 3/2004 | Greenberg |
| 6,708,221 B1 | 3/2004 | Mendez et al. |
| 6,714,536 B1 | 3/2004 | Dowling |
| 6,724,833 B1 | 4/2004 | Cummings |
| 6,751,297 B2 * | 6/2004 | Nelkenbaum ............ 379/88.13 |
| 6,826,405 B2 | 11/2004 | Dovaik et al. |
| 6,850,496 B1 * | 2/2005 | Knappe et al. ............ 370/260 |
| 6,944,452 B2 * | 9/2005 | Coskun et al. ............. 455/436 |
| 6,996,076 B1 * | 2/2006 | Forbes et al. ............... 370/310 |

OTHER PUBLICATIONS

WAP WSP Version Apr. 30, 1998—Wireless Application Protocol Wireless Session Protocol Specification (95 pages).

WAP WTA Draft Version Apr. 30, 1998—Wireless Application Protocol Wireless Telephony Application Specification (31 pages).

* cited by examiner

METHOD AND APPARATUS FOR CO-SOCKET TELEPHONY

The present application is a continuation of U.S. patent application Ser. No. 09/120,499, filed on Jul. 21, 1998 entitled "Method and apparatus for co-socket telephony", now U.S. Pat. No. 6,714,536. Additionally, this application is related to U.S. patent application Ser. No. 10/834,557, filed on Apr. 29, 2004 entitled "Method and apparatus for cosocket telephony."

BACKGROUND OF THE INVENTION

1. Field of the Invention

This invention relates generally to the integration of telephone and internet services and protocols. More particularly, the invention relates to a system whereby an internet co-socket may be associated with a standard telephone call.

2. Description of the Related Art

Call set-up technology used to establish telephone connections across the public switched telephone network (PSTN) is well known; several call set-up strategies for Internet telephony are emerging. Multimedia telephony is also emerging whereby various types of multimedia calls may be established to carry voice, video, and data. Multimedia calls are traditionally expensive and often consume large amounts of bandwidth, especially if real-time video is involved. Multimedia calls are also traditionally more complex to establish and often require technical support personnel to run specialized multimedia telephony equipment. One form of multimedia call which does not require extra telephone bandwidth is a voice-over-data modem link. Voice-over-data modems allow voice to be compressed and routed across a modem connection along with data. While being economical, these types of calls are still much more tedious to set up than an ordinary direct-dial telephone call. Simple multimedia call set-up strategies are provided on mixed-media packet networks such as those employing asynchronous transfer mode (ATM) and internet protocol (IP) technologies. Methods and apparatus are still needed to provide simple and economical forms of multimedia telephony which allow users to transparently set up multimedia calls involving both the public switched telephone network (PSTN) and mixed-media packet switched networks.

Computer telephony integration (CTI) is also a well known and rapidly advancing technology. Examples of CTI systems include interactive voice response (IVR) call centers whereby callers call in on a phone line and respond to digitized voice menu prompts with dual tone multifrequency (DTMF) signals (i.e., "touch tones"). The call center's IVR computer decodes the touch tone values and either provides information or routes a call accordingly. Some call centers use speech recognition in lieu of, or in addition to, touch tones. In many systems a caller can be identified using call line identification (CLID) information which is commonly known as "Caller-ID." CLID information may be derived from automatic number identification (ANI) information used to track billing in a central office switch. Signaling system number seven (SS7) links carry CLID and/or ANI information across a PSTN. SS7 call set-up information is carried on a common signaling channel separate from channels used to carry voice traffic.

The PSTN is the traditional telephone network made up of local-exchange carriers (LECs), competitive local exchange carriers (CLECs) and long distance inter-exchange carriers (IXCs). With the recent advent of internet telephony gateway servers, some PSTN calls may be partially carried over an internet to avoid tolls. For the purposes of the discussion herein, calls originating or terminating in the PSTN but partially routing over an internet via a gateway server are still considered to be PSTN calls. It is recognized that certain elements of the PSTN network may adopt packet switched techniques similar to an internet. For the purposes of the discussion herein, calls which represent plain old telephone service (POTS) and integrated services digital network (ISDN) but are carried across a packet switched IXC or LEC are also considered PSTN calls. For the purpose of brevity, a campus call which uses POTS or ISDN over standard telephone wiring and is switched by a PBX is considered a PSTN call. A call which originates using a packet switched protocol such as H.323 or other form of native multimedia packetized call is not considered to be a PSTN call.

In the present disclosure, a distinction is made between "an internet" and "the Internet". The term "internet" (lower case) is meant to apply broadly to any type of mixed media packet switched network. For example, an internet may be a local area network (LAN), a metropolitan area network (MAN), a wide area network (WAN), an enterprise network or a modernized public network. In most present day situations, networks of different types are joined by what is properly termed an internet. Hence an internet is a network of two or more networks joined together, normally by a bridge, router, or switch. Within the present disclosure, an "internet" refers to a network which may be joined to another network using a properly selected bridge, router, or switch. A network which is in fact isolated, for the purposes of the discussion herein, may also be defined as an internet. Conversely, the term "Internet" (upper case) refers to the ubiquitous world wide web (WWW). In most cases, a given internet is connected to and hence is a part of the Internet. Some other types of internets which may not be connected to the Internet include, for example, various enterprise WANs and some cable television (CATV) networks. Hence, "the Internet" is but one example of "an internet", and thus all uses of the word "internet" herein shall apply directly to, but are not limited to, "the Internet."

There are a wide variety of known CTI systems. One system is called "screen pop." Screen pop systems recognize incoming phone numbers using CLID type information and display a screen containing information about the caller to an agent. For example, screen pop may provide an agent with a screen of information including the caller's name, personal data, buying habits, and needs. The CLID information may also be used by CTI switching apparatus to route an incoming call to an appropriate agent based on the caller's profile. These features enhance customer satisfaction and eliminate the need to ask the caller for information which may already be in an available database. Another CTI system is called screen transfer. When a call needs to be transferred from a first agent to a second agent, the CTI information screens and data associated with the call may be transferred to the second agent. Another form of CTI involves outbound dialing. An outbound dialer is a computer telephony device which dials telephone numbers to initiate telephone calls.

In call center applications, a caller navigates the IVR menu system to select an area of interest so the call can be routed to an appropriate agent. Calls to call center oriented IVRs often require the caller to wait in a waiting queue until an agent becomes available to accept the call. In most cases the caller may wait several minutes before an agent becomes available. In more extreme cases the caller may need to wait as many as fifteen minutes, for example. An average call to an IVR call center typically involves too long of a wait in a queue. Beside offering poor customer service, long waiting queues cost companies with IVR call centers significant amounts of money. If a company has a 1-800/888 number, the company will often pay on the order of twenty cents per minute for the caller to wait in the queue. Also, the longer the queue, the more active calls the call center will need to support at a given time. This means the call center must purchase more local loop telephone lines each month from the LEC. For example, a relatively small call center with ten to twenty operators may require the equivalent of 200 or more phone lines to be able to accommodate peak traffic loads without returning busy signals. Aggregated over the United states, millions of dollars per day are spent by call centers to pay for the toll charges of callers navigating IVR systems and waiting in queues. Millions of more dollars are spent each month on the local lines needed to accommodate these callers waiting in the queues.

Another related problem is faced by organizations not having 1-800/888 numbers. If a caller makes an out-of-pocket toll call and has to wait in a queue more than a few minutes, the caller will often terminate the call. Hence the recipient organization will lose the benefit of the call, which in the commercial context may equate to significant lost revenue.

Several prior art solutions have been proposed to deal with the foregoing problems. One such system is known as "call-back." Here a caller calls the call center, navigates an IVR menu system, and is offered the option to hang up so the IVR system can call back in an estimated number of minutes. The caller is entered into a call queue and the connection is dropped. When the caller's time arrives, the system will call the caller back, thus saving the expense of leaving the line busy while waiting in the queue. This solution is attractive because the caller can be freed to do other tasks while waiting for the call-back. This increases customer satisfaction while at the same time the company handling the call saves money on telephone line and toll charges. One difficulty implicit in this approach is customer trust. Many call centers use variants of this approach where the caller is not called back in a timely fashion, often not even in the same day. Hence callers are often untrusting of the system and reluctant to hang up. Accordingly, such systems typically enjoy only limited use.

Another approach to solving the telephone queue problem is through the use an Internet call center such as the Internet Call Center recently announced by Lucent Technologies Inc. of Murray Hill, N.J. In this approach a customer does not make a phone call but accesses a company's call center through the Internet. A standard web browser is used to access the Internet call center by either keying in a URL, finding Internet call center using a search engine, or clicking on a browser bookmark which references the Internet call center. In the Lucent system, an IVR system is replaced by a set of Internet browser-related dialog forms. Hence the user accesses the call center via the Internet, navigates a set of menus, and then, if needed, clicks on a button displayed in the browser with a mouse which requests an agent to call back through the Internet using Internet telephony voice packetization methods. In this way, the user is called back through the Internet and is able to talk to an agent using a multimedia PC. All of the CTI related features such as screen pop and screen transfer are available just as though the user had entered the system using a regular telephone. This system has the advantage that no telephone charges are incurred, all data and voice traffic occurs through the Internet, saving a significant amount of money for the company operating the Internet Call Center. In addition, the Internet Call center is compatible with a normal 1-800/888 call center, so agents may interact with callers entering the system through the normal phone lines or via the Internet. In either case, the same types of screen pop and screen transfer technologies may be used. A disadvantage with using this system relates to user access. An Internet call center is designed primarily to attract web users. Many users may find it difficult or tedious to find a given web site. Users may desire to call a company over the telephone network as is common practice rather than search for a web site. Hence an innovative way is needed to obtain the benefits of an Internet call center technology while providing a simple telephone access technique.

Another known technology is called "web call-back." This is a newer version of normal PSTN call-back as discussed above. In this technology, a user navigates the Internet to reach a destination web call center. The user manipulates Internet screens using a web browser instead of a set of IVR menus, similarly to the Lucent system previously described. In web call-back, when the user selects a button, he/she will receive a call back via the PSTN from a call center associated with the Internet site. Since the call-back is placed over the PSTN, the resulting connection maintains quality and a greater degree of security. Some web call-back systems display a timer on a client web browser indicative of when the PSTN telephone call-back may be expected. Other systems are not time oriented, and may require the user to wait several days before being called back. One problem with this technique is that the user must be able to locate the associated web site. Often a user will know a 1-800/888 number and will find it convenient to call such a number instead of navigating the Internet. In situations involving local entities such as restaurants and movie theaters, the associated phone number may be known while it is less clear how to find the entity on the web. This problem is most pronounced because smaller local entities do not generally have easily identified domain names and addresses. Another problem with current web call-back systems is that the timer only provides knowledge of when a call will arrive. It does not give the user the ability to interact with the scheduling of the return call which may be advantageous as will be described with respect to an aspect of the invention described herein below. Hence while web call-back has definite merits, it still has shortcomings and limitations which need to be overcome.

Additional services are emerging which provide "web dial tone" to H.323 IP telephone users. Note "IP" stands for "internet protocol," and H.323 represents a packetized IP telephony protocol whereby voice and video telephone calls may be transmitted and received over an internet such as the Internet. Callers may initiate H.323 phone calls by dialing a web based telephone number. H.323 call centers may respond by providing video of a live agent. Also, a form of screen pop known as "data conferencing" may also be employed. Here the agent can see screens synchronized with a user's web browser and can "push" webpages and the like to a caller's browser. Similarly, peer-to-peer data conferences may be established for multimedia communication between colleagues. A data conference is a real-time multimedia telephony session whereby two or more user's may share images, computer screens, documents and other similar information while also being able to talk and exchange video. While existing systems allow a PSTN caller to patch into a data conference, the PSTN caller is limited to voice. A system is therefore needed to allow PSTN callers to enjoy toll quality voice and to set up data conferencing services with a computer attached to an internet.

The Internet is rapidly evolving to provide new means of access. For example, so-called "Web-TV" is a technology whereby inexpensive Internet appliances may be installed and operated using the television (TV) set as a display monitor while a CATV network provides Internet service. In these systems, the cable system provides the link layer interface to the user, and hence home Web-TV users will have a telephone free to make and receive PSTN calls while the CATV network provides internet service. A link layer interface is a signaling protocol combined with a physical channel and is used to carry data between stations. Also, as asymmetric digital subscriber line (ADSL) and related DSL technologies become prevalent, users will be able to support regular phone calls and extra digital services on the same twisted pair telephone line. Thus DSL subscribers will also be able to leave a telephone line free while being connected to the internet. Office workers and growing numbers of home users already have access to both a telephone line and a separate internet connection. Thus many users will use the Internet for packet transfers and a telephone line for toll quality circuit switched voice traffic. As Internet bandwidth increases and delays decrease, better quality Internet telephony voice circuits will also become available. This will allow user's to both place internet telephony calls and access traditional internet services using a single internet connection.

In U.S. Pat. No. 5,724,412 (hereinafter "the '412 patent"), a method and apparatus are disclosed which allows internet data to be appended to CLID packets. This patent discloses a message structure to allow callers to send a called party a message, to include a multimedia message via a CLID type packet. The invention disclosed in the '412 patent relates primarily to allowing a called party to receive a CLID notification which permits the called party to contact the caller over the internet. The patent envisions sending a screen of information, an e-mail address, a uniform resource locator (URL) to a home page, an FTP site, or other information. The concept enables a form of mixed PSTN and internet messaging from the caller to the call recipient. However, the invention set forth in the '412 patent does not provide a means to allow such information to be used 1) to save toll charges related to call centers and IVR systems; 2) to enable more efficient web call-back systems; or 3) to provide real-time multimedia phone calls. Hence a more capable approach is needed to send information via new forms of CLID packets which can address these problems.

Based on the foregoing, it would be desirable to have a system which integrates aspects of computer telephony with Internet services and Internet telephony. Such a system ideally would retain aspects of known CTI systems such as call-back and web call-back to reduce telephone toll charges while at the same time improving customer service. It would also be desirable if a caller could access a call center using a PSTN telephone number such as a 1-800/888 or a local number, and would be able to transfer a PSTN call to an internet session.

Similarly, it would be useful to allow a caller to call a PSTN telephone number and subsequently use an internet browser to perform those actions or selections currently performed using IVR. Such an integrated PSTN/internet capability would avoid the need for the caller to wait on hold on a telephone line while increasing customer satisfaction and reducing line charges and 1-800/888 related toll charges.

Another desirable feature lacking in prior art systems relates to allowing a caller and an agent to converse using a toll-quality voice connection. This type of arrangement permits business transactions to occur while also providing the ability to jointly view information provided by screen pop, screen transfer, database access, and related CTI features. Additionally, providing a caller waiting in a telephone queue the ability to perform other tasks (including making other telephone calls and waiting in multiple call queues simultaneously). would be of great utility The foregoing concept of automatically setting up an internet session in response to a PSTN telephone call would also be useful to enable various forms of multimedia communication. A telephone connection is established between a caller and a callee through the PSTN or other form of telecommunications network in response to a call placed by the caller. It would be useful to automatically provide a shared-screen of information visible on computer screens to both the caller and the callee on both sides of the telephone connection. Such communication would also include the ability to converse and share information over an inventive link which enables full service data conferencing to become automatically associated with a PSTN telephone call.

It would further be desirable to support a voice-over-data type service without the need to make point-to-point modem calls, and provide the capability to support multimedia data conferencing services associated with PSTN calls.

SUMMARY OF THE INVENTION

The present invention satisfies the foregoing needs by providing systems and methods which allow PSTN telephone users to make use of a mixed-media packet switched internet to support a call. The present invention centers around the concept of a co-socket. A co-socket is established in support of a telephone connection. In a preferred embodiment, a caller dials a callee to establish a point-to-point telephone connection. This established telephone connection is used to carry a SYN segment which is a part of a SYN sequence to establish an internet socket connection in support of the call. When the caller calls the callee, the callee's computer preferably pops a screen of information directly on the caller's computer screen. Using Caller-ID, the callee can identify the caller and thus establish internet communication with the caller without picking up the telephone. Alternatively, the caller can pop a screen of information on the callee's computer screen. A call queue management method is presented which exploits an established co-socket. Apparatus is presented for smart phones and CTI servers which support co-socket telephony as defined herein. Methods for use of the smart telephone and CTI server apparatus are presented to set up co-sockets in support of telephone calls. Computer software structures are presented which allow the apparatus to practice the methods. Also, computer hardware structures are presented which are allow apparatus to run software to support co-socket telephony methods. Finally, apparatus is presented for internet and telephone network equipment to support aspects of co-socket telephony. The present invention includes various aspects which support co-socket telephony. These aspects are summarized immediately below.

A first aspect of the present invention involves a computer telephony server which supports co-socket telephony. The computer telephony server includes a first coupling operably connected to a telephone line so as to receive information indicative of at least one internet address associated with a caller on the telephone line. The server also includes a second coupling to a protocol stack. The protocol stack is operably connected to a link layer interface. The server also includes a computer device operably connected to the first and second couplings. The computer device is operative to route at least one data packet via the second coupling. The link layer interface is operably connected to an internet and the data packet is addressed so as to be routed to the at least one internet address in the internet. Another similar computer telephony server is also taught which is similar to the one discussed above but which includes a computer device which maintains a call queue. A related server method employing a database translation is provided as well.

In the description above the phrase "operably connected" implies a structural relationship but not necessarily a direct connection. For example, if two modules are operably coupled, they may be indirectly connected via one or more intermediary modules. Also, an "operable connection" may involve a relationship such as a connection between a CPU and a software module which runs on a CPU. It may also involve a software connection between software modules. The phrase "caller on the telephone line" refers to the caller who placed the call received on the telephone line. Moreover, a "module" is a computer device which may comprise hardware and/or software. A "computer module" is a functional block which is embodied as a logic circuit controlled by software or a hard-wired sequential logic.

A second aspect of the present invention involves a method of managing a call queue. The method is provided for use in a computer telephony server employing co-socket telephony. A first step of the method involves reading data from and writing data to a coupling to a protocol stack. The protocol stack is coupled to a link layer interface, and the link layer interface is coupled to an internet. A second step of the method involves accepting inputs from the protocol stack indicative of selections made by a remote user. A third step of the method involves transmitting a data value via the protocol stack indicative of when a response can be expected from the computer telephony server to the caller. A fourth step of the method involves maintaining a call queue, whereby information received via the protocol stack from the caller may be used to alter the priority of a caller within the call queue. A fifth step of the method involves dialing a telephone number to establish a telephone connection with the caller when the caller's priority in the queue has reached a specific value.

A third aspect of the present invention is a method of establishing a co-socket connection. This method is practiced by equipment which initiates a connection. Equipment which initiates a connection is said to be at the "requesting end" of the connection. In a client-server paradigm, the requesting end corresponds to the client. A first step of the method involves sending a data segment from a requesting end to a telephony interface. The data segment is transmitted from the telephony interface to a remote computer via a telephone connection to initiate the establishment of a co-socket. A second step involves communicating via the co-socket with the remote computer via a link layer interface different from the telephone connection. In this method, the remote computer may be a CTI server, a peer smart telephone, or any other computerized device capable of a call via a telecommunications network. While the aforementioned method is practiced on a requesting end of a connection, a similar method is disclosed for use on the server end of the same connection. Another similar method with a slightly varying scope is also presented for use on the server end of the connection.

Another aspect of the present invention involves a smart telephone. The smart telephone is analogous to the aforementioned CTI server apparatus, but involves a client or requesting end of the connection. The smart telephone practices the method for establishing a co-socket as discussed above. The smart telephone consists of a computer telephony interface which is operative to initiate a telephone connection. The smart telephone also has a dialer operative to dial a telephone number to initiate the establishment of the telephone connection. Additionally, the smart telephone has a module which initiates the establishment of a co-socket with a remote device by transmitting a data segment via the telephone connection. Subsequent communication using the co-socket is coupled via a link layer interface other than the telephone connection. Another version of a smart telephone is also presented which uses a database translation to determine a co-socket address of a caller. An application program for execution on the database version of the smart telephone is also presented. An internet database server used to provide co-socket addresses for use with the database version of the smart telephone is taught as well.

A fifth aspect of the present invention centers around a sockets-telephony API software library. The sockets-telephony API software library includes a co-socket connection establishment function. The co-socket connection establishment function involves a first software module coupled to a telephone connection. The first software module is operative to direct information to be transmitted and/or received via the telephone connection. The co-socket establishment function also includes a second software module coupled to the first software module and coupled to a co-socket data structure which is visible to the function. The second software module is operative to communicate with a remote computer by transmitting and/or receiving at least one data segment in a co-socket establishment sequence. The second software module causes the first software module to be run so the at least one data segment is routed via the telephone connection. Once the co-socket connection is established, subsequent communication proceeds between a process owning the co-socket data structure and a process located on the remote computer via a link layer interface other than the telephone connection. Also presented is an application program which calls the forgoing function. Also presented is an operating system including the foregoing function. In addition, a computer or smart telephone running the operating system with the foregoing function is disclosed.

A sixth aspect of the present invention involves a computer program. The program includes a coupling used to establish a PSTN telephone connection via a computer telephony interface API. The program also includes a coupling to a network via a network interface API. A software module operative to initiate a point-to-point PSTN telephone connection to a remote station using the computer telephony API is included in the program. The computer program also has a software module operative to send a SYN segment to the remote station via the point-to-point PSTN telephone connection using the computer telephony interface API to establish a co-socket. The program also has a software module operative to accept information from a local data buffer, perform application layer formatting of the data, and transmit the formatted application layer data to the remote station via the network interface API function call.

Another aspect of the present invention involves a method of sharing information with a remote computer for use in a computer operating system. A first step of the method involves intercepting information contained within an information stream transmitted from a first local process to a second local process. A second step of the method deals with making a copy of the information. A third step involves allowing the original information stream to reach the second local process. A fourth step involves passing at least some of the copied information to a protocol stack process which in turn forwards the information to the remote computer via a co-socket associated with a PSTN telephone call.

An eighth aspect of the present invention deals with apparatus coupled to a telephone switch. The apparatus employs a translation unit which receives ANI or CLID data and translates said information relating to a caller's client internet socket address. The apparatus also employs a module which places information relating to the caller's internet socket address into a data packet for transmission to a dialed telephone number. The internet socket address includes a port number to enable a callee to send a screen of information via an internet to be displayed on the caller's computer screen. A apparatus similar is also disclosed which evaluates dialed number information and ANI or CLID information and generates a packet sent via an internet to establish a co-socket in support of a call. A related method of processing telephone calls within a telephone network in support of co-socket telephony which may be practiced by the disclosed apparatus is also presented.

BRIEF DESCRIPTION OF THE FIGURES

The various novel features of the invention are illustrated in the figures listed below and described in the detailed description which follows.

DETAILED DESCRIPTION OF THE INVENTION

Reference is now made to the drawings wherein like numerals refer to like parts throughout.

Figure 1:
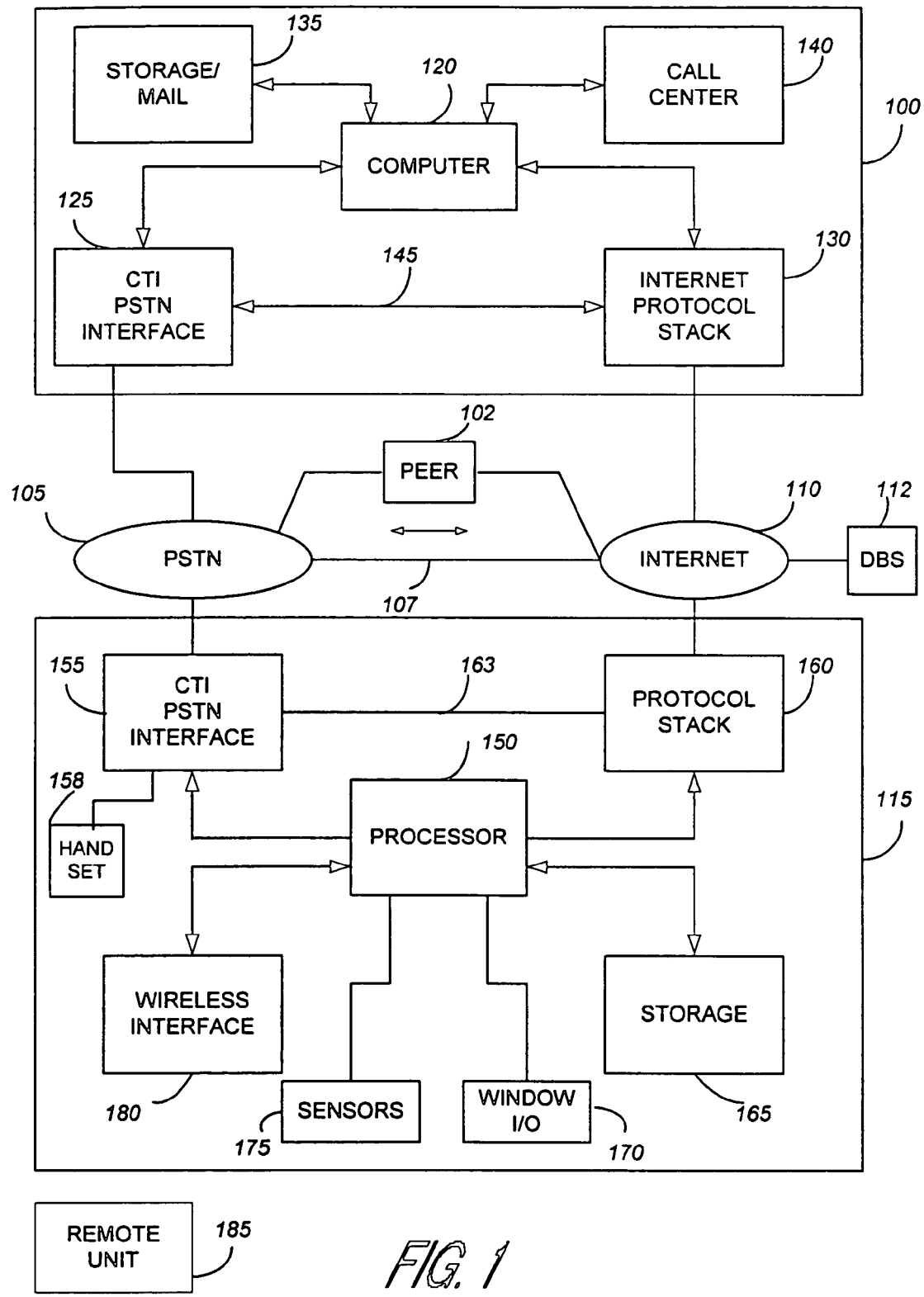
FIG. 1 is a block diagram representing a CTI server and a smart telephone connected via a point-to-point PSTN connection and an internet socket connection according to the present invention.

FIG. 1 illustrates a first embodiment of a communication configuration whereby a CTI server 100 and a smart telephone 115 are each coupled to a PSTN 105 and an internet 110. A peer device 102 may be another device similar to the smart telephone 115, and is also coupled to the PSTN 105 and the internet 110. An optional database system 112 may also be coupled to the network configuration via the internet 110. As will be discussed in connection with the embodiments illustrated by FIGS. 10–12, the database 112 may also be implemented by equipment within the PSTN 105. The PSTN 105 may be coupled to the internet 110 via various types of connections 107 which may include a gateway connection to route long distance voice traffic across the internet 110.

In a preferred embodiment, the database module is an internet server. The database module 112 includes a coupling to the internet 110. This coupling is operative to receive a client request from the internet 110 including information relating to a telephone number associated with a potential callee. The database 112 associates the telephone number with an internet address. The database 112 includes a reply module connected to the coupling and is operative to return a data packet via the coupling to the internet 112 upon association of the request with the internet address. The data packet sent out by the database 112 is related to the internet address of the callee. Once this data packet is returned to the smart telephone 115, the smart telephone 115 may initiate a co-socket with the callee instead of, or in addition to a telephone connection. Likewise, the CTI server 100 may read CLID data associated with an incoming call and send this information to the database 112 to find out an internet address related to the caller. This allows the CTI server 100 to pop a screen of information on the caller's screen in response to an incoming call. In an alternative embodiment, the CTI server and/or the smart telephone 115 may incorporate a local database to translate telephone numbers to internet socket addresses.

The CTI server 100 includes a main computer 120 which is coupled to a CTI interface 125, an internet protocol stack 130, a storage unit 135, and an optional call center 140. For example, the main computer 120 may be implemented with an Intel Pentium™ processor or a computer board such as a mother board built around an Intel Pentium™ processor. In this case the coupling to the storage area 135 may be implemented using a bus connection to a solid state memory. In most embodiments, the storage area 135 is implemented at least partially with a mass storage device such as a disk drive. In this case, the mass storage unit 135 is preferably coupled via a disk controller which is itself coupled to the main computer 120 via a standard type of bus interface such a peripheral component interconnect (PCI) bus. The storage unit 135 may be configured to support voice mail and other forms of multimedia message storage. The internet protocol stack 130 is typically implemented as software process on the main computer 120 and hence is coupled via a software connection such as an interprocess communications channel.

Application programs running on the main computer 120 typically access the internet protocol stack 130 using a function call to an API such as a WinSock API or a UNIX™ Sockets API. The CTI interface 125 is also usually implemented as one or more software processes which execute on the main computer 120. An application program running on the main computer 120 is coupled to the CTI interface 125 via an interprocess communications link provided by an operating system running on the main computer 120. In this case, the coupling is provided between an application program running the main computer 120 and the CTI interface 125 via a call to a CTI API. In general, an argument list to a function call typically coupled information from the main computer 120 to the CTI interface 125. Call queue and IVR systems are ideally maintained by applications programs which run on the computer 120. The call center 140 preferably consists of an automatic call distribution (ACD) system which routes incoming calls to one or more call processing agents. The main computer 120 is typically coupled to the call center 140 using a plurality of twisted pair cables, one pair for each agent station. In some embodiments trunking may be employed whereby a single twisted pair carries a plurality of calls to a remote call center and multiplexing and demultiplexing equipment is used to separate and combine the multiple calls on the single twisted pair. Some systems may couple the call center 140 to the main computer 120 using LAN technology. LAN technology for call distribution involves compressing and packetizing calls for shipment over a coaxial cable. An optional data link 145 couples the CTI interface 125 directly to the internet protocol stack 130, which is of the type well known in the art. This direct data link 145 allows information at lower layers (network, link and physical layers) of the protocol stack 130 to communicate with the CTI interface 125. This data link is typically embodied either as a parameter list involved in a function call or via an interprocess communication mechanism.

Couplings between all the modules in the CTI server may be implemented through the computer 120. For example, these couplings may be implemented by auxiliary data paths, direct memory access transfers, or directly by the processor using move operations. The input/output structure of the internet protocol stack 130 preferably includes a first coupling to an application layer via an API accessed by an application program running on the computer 120, and a link layer interface to a remote network device in the internet 110. Common examples of link layer interfaces include modems which connect a home to an ISP, a PSTN voice telephone circuit established between two users, a CATV connection from a Web-TV client to a CATV based ISP, or a LAN connecting from a computer to a remote internet server. Each of the foregoing link layer interfaces (as well as other similar arrangements) may be used within the present invention.

Referring again to FIG. 1, the smart telephone 115 includes several subcomponents. The smart telephone is controlled by a processor 150 which can be any logic processor including for example an ASIC, an embedded microprocessor, or computer motherboard, each of which are well known in the art. For example, an Intel Pentium™ processor may be used in a smart telephone implemented as a personal computer. The Intel Pentium™ processor employs on-board functional units and an on-board cache to execute a version of the so-called Intel Instruction-Set. The Intel Pentium™ interfaces to an external system using a data bus, an address bus, and a control bus. Stand-alone smart phones which are not implemented as a part of a personal computer may be implemented with specialized microprocessors such as the ARM processor from Advanced RISC Machines Inc. The ARM processor employs a reduced instruction set computer (RISC) architecture and may be integrated on the same chip with special purpose circuitry to form a customized type of microcontroller. More standard types of microcontrollers such as the MC68HC16 by Motorola Inc. may be also used to implement the processor 150 of the smart telephone. The MC68HC16 integrates a 16-bit MC68000 processor core by Motorola Inc. with a collection of peripheral devices on the same chip. The interface and design techniques for all of these types of processors are well known and are documented in the microprocessor literature and the documentation available from the aforementioned companies. Once programmed, the processor 150 may be viewed as being constructed of various computer modules which interact and perform their programmed functions. In an ASIC design, the processor 150 may be implemented as an interconnected combination of hardwired computer modules.

The processor 150 is coupled to a CTI interface 155 and to an internet protocol stack 160. The CTI interface is also preferably coupled to a handset 158 which may alternatively be coupled directly to the processor 150. The internet protocol stack 160 ideally has a structure similar to the protocol stack 130 as discussed in connection with the CTI server 100 above. An optional direct coupling 163 may be provided between the CTI interface 155 and the protocol stack 160. The processor 150 is preferably also coupled to a storage unit 165 which includes memory and which may include mass storage implemented in technologies such as hard disk drives, solid state disk drives, or other means. The processor 150 is also coupled to an input/output terminal 170 which includes a graphics display capable of displaying windows and/or dialog boxes. The input/output terminal also preferably includes a keyboard and/or mouse to accept user inputs. In the present embodiment, the processor 150 is also be advantageously coupled to a one or more sensors 175. Examples of sensors which may be coupled to the processor include a video camera, a digital camera, a scanner or other multimedia data collection means. In a second embodiment of the smart telephone of the present invention, the processor 150 is also coupled to a wireless link layer interface 180. The wireless interface 180 may involve a wireless LAN and is preferably used to couple the smart telephone 115 to a remote unit 185. The remote unit 185 provides mobility to the user by allowing him or her to leave the vicinity of the smart telephone but still be able to handle calls and manage program operation on the smart telephone.

The apparatus of FIG. 1 may operate in many different modes to support various methods and applications. Consider first a scenario whereby a caller using the smart telephone 115 wishes to call the call center 140 which is coupled via the CTI server 100. In this case the smart telephone 100 is associated with the caller. Assume that the call center 140 is reachable via a PSTN 1-800/888 number. A caller preferably dials the 1-800/888 number using either a keypad associated with the handset 158 or an automatic CTI-controlled dialer which may be part of CTI interface 155. In this case the phone number is found in a list or is entered using the I/O windows interface 170. Whichever dialing method is selected, the dialed 1-800/888 number transmitted over a telephone line to a PSTN switch located in PSTN 105, possibly via a PBX (not shown). At this point the PSTN may interact with the dialed number or the CTI interface may add extra data to the dialed number indicative of an internet socket address. For now, suppose no extra information is added, but the PSTN 105 routes a PSTN data packet to the CTI interface 125. A PSTN data packet is defined as any data packet which routes over the PSTN. PSTN data packets are used for call set-up, communication systems management, and other purposes. PSTN data packets are most typically sent using SS7 or X.25 protocols.

When the PSTN data packet arrives at the CTI interface 125, several actions may occur. For the present example, consider the case where the PSTN data packet includes only standard CLID information to identify the caller. In one embodiment of the present invention, the CTI interface 125 controls the line pick-up process to accept the call. At this point CTI interface 125 listens for a tone sequence. In this exemplary embodiment, the expected tone sequence contains a synchronize sequence numbers (SYN) segment used to set up an internet connection. SYN segments, and internet stream socket and datagram socket connection establishment procedures are well known in the prior art, and are discussed in full detail in "TCP/IP Illustrated Vol. 1-3," by W. R. Stevens Addison-Wesely Publishing 1994, which is incorporated by reference herein in its entirety. A segment is generally defined in TCP as a timed packet. When a segment is transmitted, a timer starts, and when an acknowledgment is received, the timer stops. If the timer runs out, a new segment is transmitted. In the TCP packet header there is a flag called SYN. This flag is set during the exchange of segments used to establish a TCP connection. A TCP connection is also called a stream socket. The SYN packet exchange sequences used to set up a TCP connection are discussed in detail in Section 18.6 of Volume 1 of the aforementioned Stevens reference. SYN segments are embodied as UDP datagrams in the TCP protocol. Note that while TCP is chosen as the protocol for use with the present embodiment, other protocols and formats may be used with equal success. For example, a "co-socket" may be established using a session layer protocol which executes over a transport layer protocol. Standard sockets are transport layer connections. Co-sockets as defined within the scope of the present invention may be defined at any specified layer of any selected protocol stack without restriction. Hence at any point, a SYN segment may be replaced with a connection establishment packet for a given protocol.

Variations of the TCP connection establishment procedure may be desirable when carried out wholly or partially across a point-to-point PSTN telephone connection instead of an internet. Therefore, as used herein, a "SYN segment" is generally defined as any data which may be transmitted via various methods and formats as a part of any internet connection establishment process. In one generalized form, a SYN segment may simply constitute an internet address used to indicate an internet address and port number needed to begin a TCP/IP SYN segment exchange sequence. Also, as used herein, a point-to-point telephone connection is generally defined as any dialed telephone connection set up between two or more telephones. Furthermore, a point-to-point PSTN telephone call is defined as any telephone connection between users set up using a PSTN or PBX originating or terminating line. This connection may be established via a PBX between phones within an enterprise, and may also route partially across an internet. The point-to-point PSTN telephone call is not established as a PC-to-PC multimedia packetized telephone call using a format such as H.323. Such telephone calls already have full multimedia capabilities.

Referring again to the exemplary embodiment of FIG. 1, the CTI interface 125 answers the phone in response to a ring-signal and listens for a tone sequence. If the caller is using a smart telephone such as the smart telephone 115, the smart telephone 115 is the requesting end of the connection so transmits a SYN packet over the established point-to-point telephone connection. If the phone goes unanswered, but CLID or related information is accepted by the called number, then a point-to-point connection is still established in response to the call, but the point-to-point connection may be termed a PSTN-datagram connection instead of a voice circuit. Again turning to the aforementioned example, the CTI interface receives and decodes a sequence of tones indicative of a SYN segment. In this example the SYN packet is transmitted from CTI interface 155 to CTI interface 125 and is used to set up a TCP/IP stream socket connection across the Internet. Hence in this example, internet 110 corresponds to the Internet.

Several methods may be used by the apparatus of FIG. 1 to establish an internet connection using a point-to-point telephone connection which has been established via the PSTN 105. These methods are discussed in greater detail below in connection with FIGS. 5–7 and FIG. 11. For present, assume that an entire TCP/IP stream socket connection establishment SYN sequence is exchanged between smart telephone 115 and the CTI server 100 using the CTI interface 155 and the CTI interface 125. The Cn interface 125 is coupled to the protocol stack 130 via the computer 120 or the optional direct coupling 145. Likewise, The CTI interface 155 is coupled to the protocol stack 160 via the processor 150 or the optional direct coupling 163. Using the apparatus and method described thus far, in this example a TCP/IP stream socket is established via the Cn interfaces 125 and 155. The connection is then passed across to the protocol stacks 130, 160 to enable internet data communication. The direct couplings 145 and 163 are provided to allow the protocol stack processes 130, 160 to directly interact using the CTI interfaces 125, 155 which communicate using the point-to-point telephone connection established across the PSTN 105 as a link layer. Once connection establishment data has been sent, the protocol stack may then switch its link layer interface from the point-to-point PSTN link to a link coupled to the internet 110. Note a stream socket established in this manner is a co-socket as defined hereinabove.

As will be discussed in greater detail below, many variations of the above described method may be used to establish an internet co-socket. The above example illustrates one variation whereby the entire co-socket connection establishment sequence is carried out using the point to-point PSTN connection to supply the link layer interface. Subsequently, the link layer of the co-socket is switched a link layer interfaces coupled from the protocol stacks 120, 160 to the internet 110. Another embodiment requires that only a first SYN segment be transmitted over the point-to-point telephone link with all subsequent SYN segments being transmitted on the link coupled to the internet 110. As further discussed below, still other embodiments utilize an initial SYN segment which is encoded into a CLID packet and transmitted via a PSTN data packet such as an SS7 packet. The CLID information of the caller may be replaced by SYN data using a variety of methods as discussed herein in connection with FIGS. 5–7 and FIG. 11.

Figure 2:
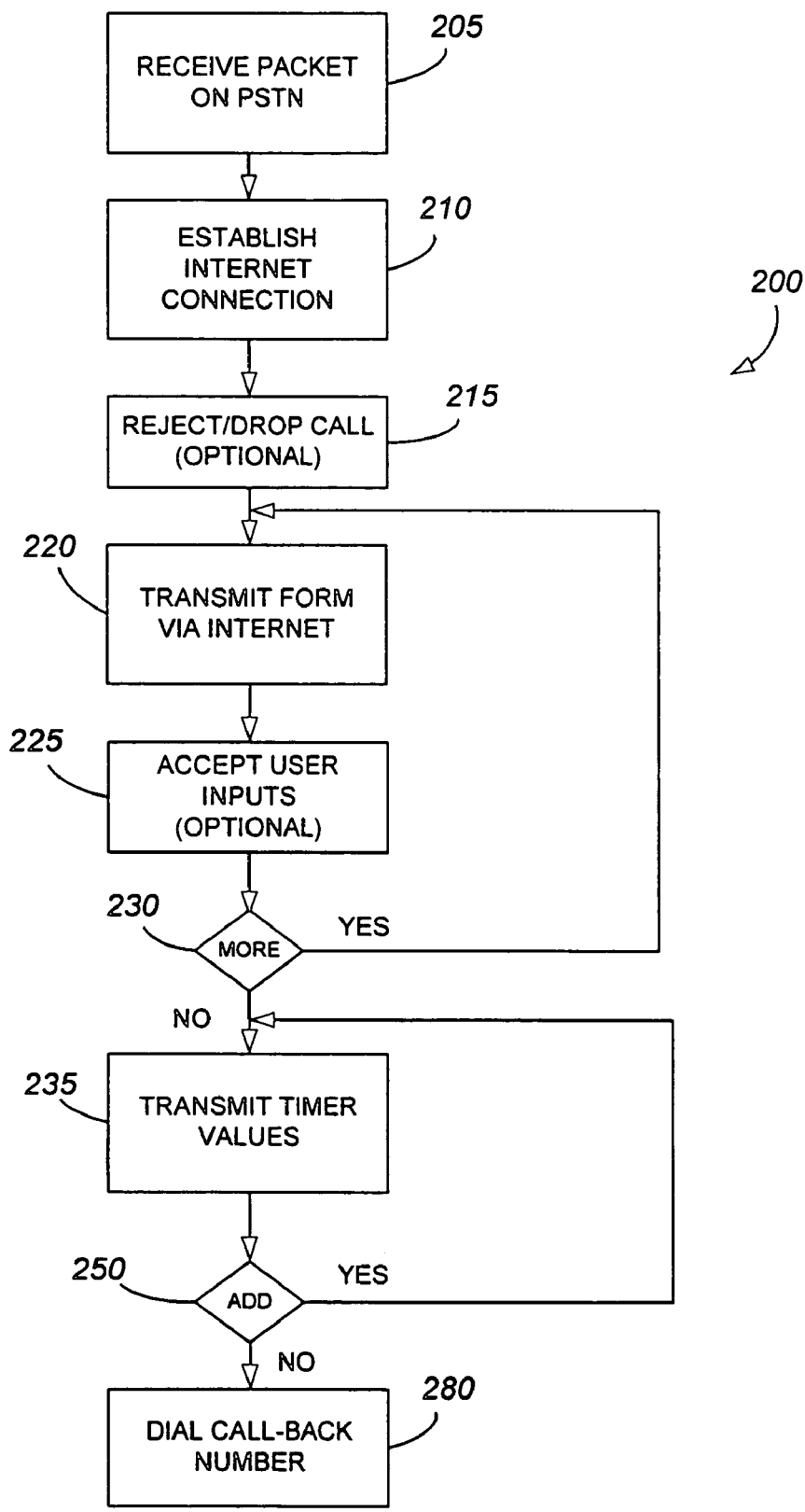
FIG. 2 is a flow chart illustrating a CTI server web call-back processing method according to the present invention.

Referring now to FIG. 2, a call processing method 200 employed by the CTI server 100 when called by a smart telephone client 115 via a point-to-point PSTN connection is disclosed. For purposes of illustration, consider the example wherein a caller is required to navigate a set of menus and wait in a queue to speak to an agent residing in the call center 140. In a first step 205 the CTI server receives a SYN segment over the PSTN. This SYN segment may be transmitted using a CLID-like packet sent via SS7 before the server 100 answers the call, or the data packet may be transmitted over the point-to-point PSTN connection using a tone sequence once it is answered by the CTI server 100. In exemplary embodiments where a non-smart phone initiates the point-to-point PSTN connection, the SYN segment may be transmitted by having the caller key in touch tones, press an automatic dialer button, or speak an internet address which is then converted using voice-to-text translation within the CTI server 100. It can be appreciated that a broad variety of different combinations may be used in such applications without departing from the spirit of the invention.

Once the SYN segment data packet is received, an internet connection is established in a second step 210. For example, suppose the internet connection is a TCP/IP stream socket set up using the co-socket techniques of the present invention. More details of how this step may be performed are provided in connection with FIGS. 5–7 and FIG. 11. Once the internet connection is established per the second step 210, control passes to a third step 215. In this third step 215, the call may be preferably dropped or rejected. This step 215 is optional and may be initiated, for example, only after receiving a caller consent input. If the internet socket is established per the second step 210 using a data packet received in the first step 205 within a SS7 CLID packet, then the call need never be answered, but may be rejected outright in the third step 215. After or before the optional third step 215, control is passed to a fourth step 220 which transmits a dialog form to the caller via an internet. The reason the call may be dropped or rejected is that the caller may use a dialog box such as the dialog box 300 (see discussion of FIG. 3 below) displayed on the computer screen 170 instead of the IVR voice prompts presented by the CTI server 100. Hence when the CTI server gets a confirmation indicating the caller's computer has cooperated in establishing a co-socket, the call is preferably rejected because the caller will use the internet call queue discussed below and the more expensive and less friendly telephone connection is not presently needed.

The dialog box 300 is maintained over the internet, ideally using a web browser. In a first embodiment, the dialog box may appear directly in a web browser window, or alternatively may be displayed in a separate window using, for example, a CGI script, a browser plug-in, or a Java applet. CGI scripts, browser plug-ins, and Java applets are well known in the computer arts and are discussed in detail, for example, in "Netscape Technologies Developers Guide" by L. Duncan and S. Michaels, Ventana Publishing, 1997, and "Web Developer's Secrets," by Harold Davis, IDS Books Worldwide, 1997, both of which are incorporated by reference in their entirety herein. It should also be noted that any application layer program may be used to accept and display the aforementioned dialog box.

Once the dialog box 300 is displayed on the caller's computer screen based on information received from the fourth step 220, control passes to an optional fifth step 225 which accepts a remote caller's inputs across the internet, preferably by accessing a sockets API. After the optional user inputs are received, a decision 230 is made to determine if more input is needed, in which case control is passed back to the fourth step 220. The fourth step 220 transmits another dialog box and passes control to the fifth step 225 which waits for more user input. Different variations of this input scheme are known to those skilled in the art and are within the scope of the present invention. Once no more inputs are required, control is passed to a sixth step 235 which transmits one or more queue timer values to the remote caller via the internet. Depending on the application program used to display the timer at the remote location, the timer can be continually decremented and redisplayed in a count-down fashion on the display to the remote caller's terminal. If the CTI server 100 wishes to modify the estimated caller queue wait time, it sends out an updated time which will divert the decrementing counter from its path by reinitializing it to a new estimate. The sixth step 235 proceeds until either the timer runs out or additional wait time is requested by the remote caller. If additional time is requested, a decision 250 is made to accept the additional time and to pass control back to the sixth step 235 to add this time to the timer. The decision 250 also allows the user to freeze a timer which in effect, adds more time to the queue-wait. After the timer has timed out, control passes to a seventh step 240 which dials a PSTN phone number associated with the caller. The PSTN phone number may be obtained by the CTI server 100 from a CLID packet, a CGI script, a Java applet, user input to a dialog box, a database, or other well known technique.

The aforementioned method 200 is especially useful because it allows a caller to manage multiple tasks in parallel. As a first example, suppose a caller wishes to make three phone calls at once, each of which involve non-trivial telephone queue waiting times. Suppose the caller initiates the calls from the smart telephone 115. The caller calls a first CTI server and establishes an internet dialog session as discussed in connection with the method 200 above. After interacting as in the fifth step 225 with the dialog box 300, the user receives an estimated queue time according to the sixth step 235. This time is displayed in a first timer window. Assume for example that the queue wait is ten minutes. Next the caller decides to make a second phone call while the first timer is running. The same process is repeated, and a second queue time of twelve minutes is reported. Next the caller places the third call and repeats the process once more, this time receiving a queue wait time of six minutes. Depending on the application layer program running on the smart phone 115, either multiple timer windows may be displayed or a single timer-manager window may be displayed. A timer-manager window allows a user to conveniently view multiple queue-wait times and increment times in various increments using point-and-click technology as discussed in connection with FIG. 3 herein. The user may click on various buttons to freeze remote queue-timers or add time. Further assume that by the time the user receives the six minute time for the third call-queue, the first call queue is reduced to five minutes. In traditional systems this would create a difficulty unless the call to the first call center requires less than a minute. By freezing timers or adding times, the caller may let the call queues run down and freeze them near the one minute point or may add time to them. Hence instead of waiting in three consecutive queues, the caller can spend the time making the calls instead of waiting.

In another scenario, assume that the caller is waiting in a twenty minute call queue, and after waiting eighteen minutes, the caller's attention is distracted by an urgent matter for five minutes, or a second call is received (such as from an important customer). Instead of losing the eighteen minutes accrued waiting in the queue, the caller may freeze the timer at the eighteen minute mark until the urgent matter or second call is completed. Upon completion, a freeze button such as the freeze button 315 of FIG. 3 below may be actuated whereby the timer is again allowed to proceed. In essence, the caller has allowed others in the queue to progress ahead without having to reinitiate the call and start at the beginning of the queue again. Additionally, the CTI server associated with the call center has not accrued telephone toll charges during the "freeze" period. The ability for the user to interact with the amount of time left in the call queue represents an improvement over prior art web call-back systems as previously described.

Another beneficial aspect of the smart telephone 115 of the present invention is the ability for the caller to be physically separated from the smart phone while waiting in one or more call queues. The wireless interface 180 is used to transmit timer status information (and optionally a voice connection) to a user who is remote to the smart telephone 115. Assume for example that a caller is managing multiple call queues and is subsequently called away from the smart phone 115. The caller then directs the system to forward all the timer data and a voice circuit to the remote unit 185. By carrying the remote unit 185, the caller can be at a different location from the smart telephone and perform many or all of the functions discussed above using the smart telephone 115 via the remote unit 185.

It should be noted that the web call-back system as described above may be initiated by either PSTN calls or, for example, H.323 packet calls. In this latter case, the first step 205 of the method 200 involves receiving SYN packets over an internet instead of the PSTN. The benefits of allowing the caller to freeze queue timers or add time to call queues may thus provided to web callers as well.

Figure 3:
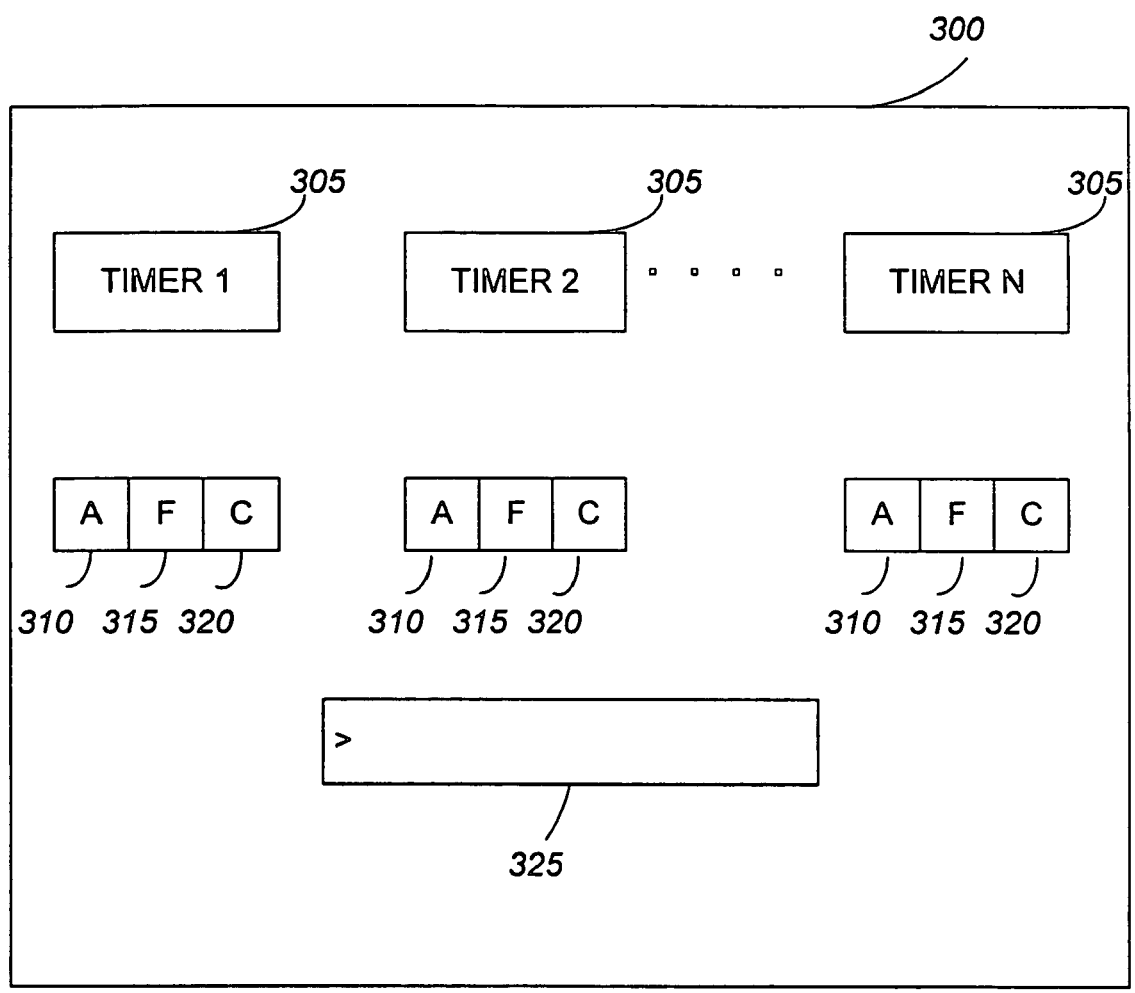
FIG. 3 is an exemplary information window display used to assist a user in managing multiple telephone queues.

A first embodiment of a user interface menu 300 displayed by a smart phone according to the present invention is illustrated in FIG. 3. The user interface menu 300 may be displayed by an application program to include a web browser's main window, a plug-in, a CGI script, an applet, or any program from within an operating system. A timer window 305 may preferably display the remaining wait-queue time for each active wait-queue. An add button 310 is used to cause time to be added to the associated time as displayed by timer 305. A freeze button 315 is used to cause the associated timer 305 to freeze, as previously described. A count button 320 is used to cause the associated timer 305 to resume counting. When these buttons are selected, packets are transmitted to the remote CTI server 100 and are acted thereupon in the eighth step 250 of method 200 as shown in FIG. 2. Additional inputs and buttons may be made available to add times and perform other interactions with the wait queues using extra dialog windows or icons as illustrated by the graphics object 325. For example, a graphics object 325 may support control commands to forward data and calls to the remote unit 185. The smart telephone 115 supports other inventive uses for CTI initiated co-sockets. These uses are discussed below in connection with FIGS. 8 and 9. Note also that the smart telephone 115 may also be used to perform internet database dialing as discussed in connection with FIG. 13.

Figure 4:
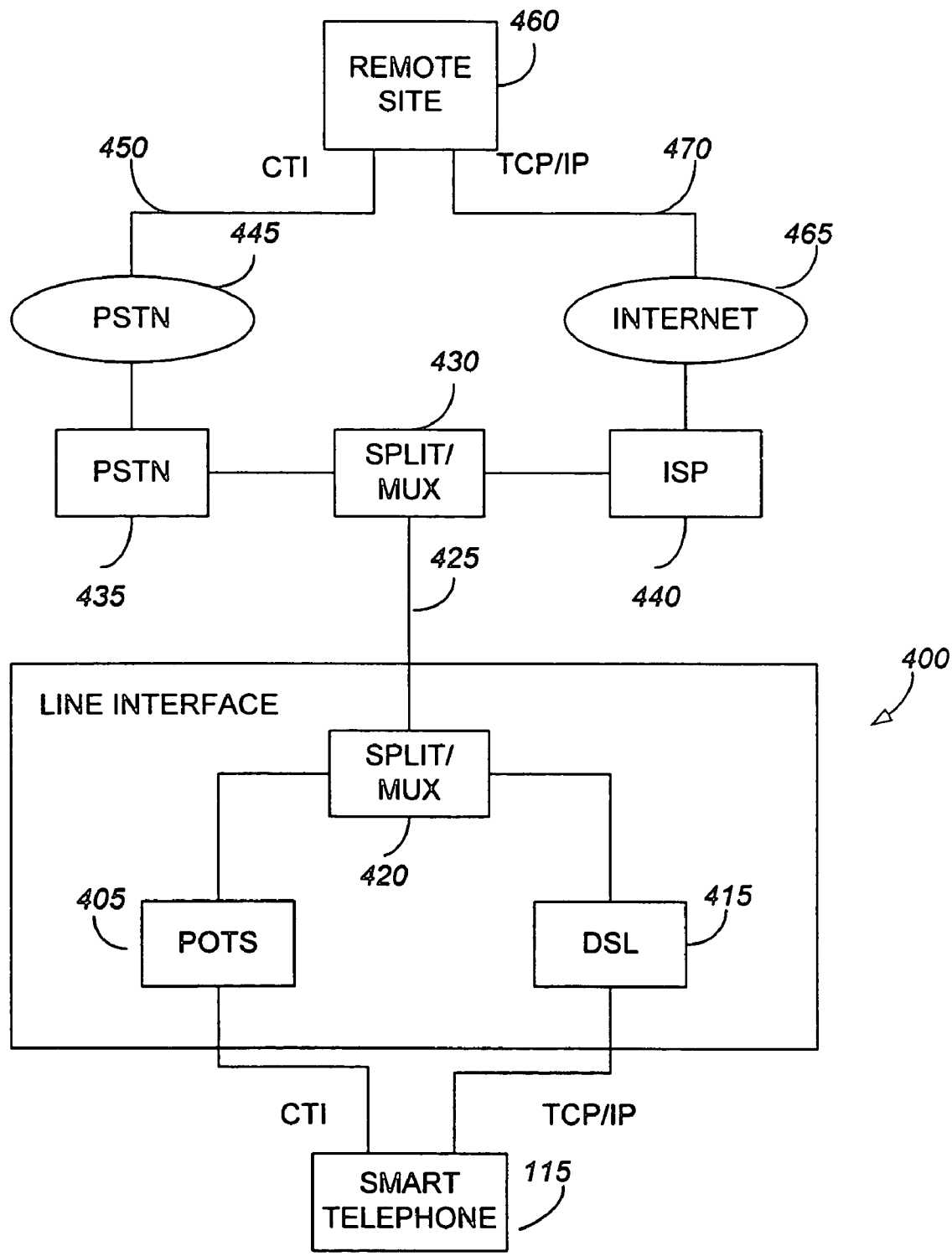
FIG. 4 is a functional block diagram illustrating a point-to-point PSTN connection/co-socket architecture using a single DSL or multiplexed telephone line.

Referring now to FIG. 4, a line interface technique is illustrated for connecting the smart telephone 115 to support a point-to-point telephone connection and an internet link layer interfaces using a single telephone line as a physical layer interface. In the embodiment of FIG. 4, the smart telephone 115 is coupled to a line interface 400 which preferably includes a digital subscriber line (DSL) modem of the type well known in the art. The DSL modem is operative to convert a high speed data stream, for example on the order of up to 6 Mb/s into an out-of-band carrier signal used to transmit data across a phone line. Meanwhile a plain old telephone service (POTS) interface is used to support a point-to-point telephone connection to carry voice traffic. In some cases the POTS interface may be substituted for a digital interface such as an ISDN line. Alternatively, voice traffic may be multiplexed directly into the DSL data signal. In most present day DSL applications, a splitter 420 is used to separate the POTS voice circuit from the out-of-band DSL data. Alternatively a splitterless DSL modem technology may be used. The basic concept behind the splitter 420 is to provide a means to separate the voice channel from the data stream transmitted over the DSL channel. If the voice data is packetized and multiplexed onto the DSL data signal, then the splitter 420 may be viewed as the multiplexer which performs this function. In this case the splitter block 420 should be physically located to the other side of the DSL modem 415 and the POTS interface 405 so as to be connected between these devices and the smart telephone 115.

As shown in FIG. 4, the splitter 420 provides a coupling to a telephone line 425. The telephone line 425 couples via local wiring or wireless means to a second splitter 430. For example, in systems employing splitters, the splitter 430 separates the PSTN voice circuit from the DSL circuit and forwards the PSTN voice frequency signal to the PSTN while forwarding the DSL signal to a DSL interface. In most cases the splitter/multiplexer 430 decode the DSL signal and sends a bit stream to an internet service provider (ISP) 440 over a digital link. For example, many DSL signals can be multiplexed onto a fiber and routed to the ISP 440. The digital data is forwarded from the ISP 440 via an internet 465 to a link layer interface 470 which carries typically a TCP/IP packet stream to a remote site 460. If the multiplexed approach is used whereby the voice circuit is multiplexed onto the DSL signal, then the splitter/multiplexer 430 will separate the voice data and forward it to a PSTN (or local) voice circuit. A PSTN interface 435 is used to process the voice circuit and to couple it to the PSTN 445. The PSTN 445 is used to couple the voice circuit to the remote site 460 over a line telephone 450, preferably controlled by a CTI interface.

The operation of the apparatus of FIG. 4 is essentially the same as that discussed in connection with FIGS. 1–3 above. Details of the CTI based co-socket connection techniques are discussed in connection with FIGS. 5–6 and FIG. 11 herein. Again, the concept of utilizing the smart telephone 115 having a PSTN link layer interface to establish an internet session, which is then switched over to a link layer interface connected to the internet 110, is employed. Note a telephone connection is a link layer interface which connects a caller to a callee. This functionality can in fact be implemented in separate links using a single telephone line as a physical layer interface. Additional but related embodiments involve a second telephone line, a separate LAN connection, a Web-TV internet access point or an enterprise WAN connection, for example. The use of DSL is a special case of the smart telephone configuration wherein two separate links are effectively provided by a single telephone line used as a shared physical layer interface between two link layer interfaces.

Figure 5:
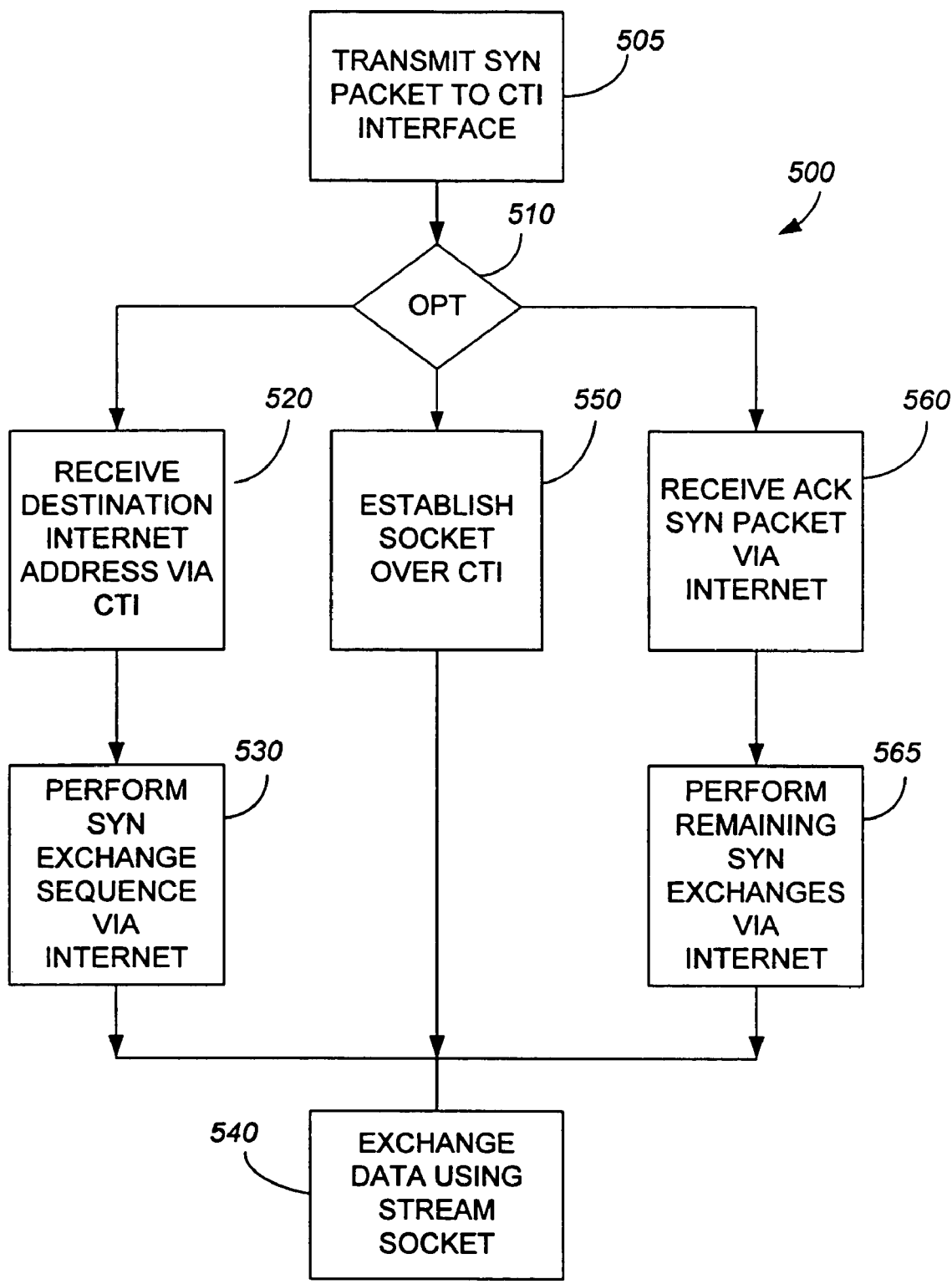
FIG. 5 is a flow chart illustrating a method of co-socket initiation utilized by a calling device according to the present invention.

Referring now to FIG. 5, a method 500 is illustrated to establish an internet co-socket with a remote station via a separate point-to-point telephone connection. This method enables, inter alia, multimedia phone calls which route voice traffic over the PSTN, and also route data traffic over the Internet. In an exemplary embodiment, the method 500 is practiced by the smart telephone 115 of FIG. 1 which represents the calling or requesting end of a connection, although other configurations can be used. In general, the method 500 may be practiced by any telephone device which initiates a multimedia co-socket connection. In the exemplary embodiment, the method 500 starts when the smart phone 115 has already dialed a phone number corresponding, for example, to the distant end CTI server 100 or the peer smart phone 102 of FIG. 1. In a first step 505, a SYN segment is sent to the distant end using a CLID packet, touch tones, speech, or other available means. In campus or similar environments, a fixed or dynamic table mapping ANI data to socket addresses may be used. In this case a "dumb" telephone (i.e., a standard telephone without processing capabilities) may be used, since an enterprise computer can be used to map the dialed number and ANI data into a SYN segment containing the information needed to initiate a session to establish a co-socket between the computers belonging to the caller and the callee. Hence in this campus environment, even a "dumb" telephone can cause information to be routed directly to a callee's socket address to automatically pop a screen directly on the callee's computer. Similarly, ordinary telephone conference initiation procedures may be followed to automatically initiate co-sockets for data conferencing between multiple users without the users needing to log into a common webpage or otherwise set up the data conference. Embodiments using ANI and CLID packets are discussed in connection with FIGS. 10 through 12 herein. Whatever the method chosen, the first step 505 involves transmitting at least enough information to notify the distant end and prompt it to establish a co-socket.

Upon completion of the first step 505, control passes to an options decision point 510. The options decision point 510 may represent a selection operation or may represent a hard-wired transfer of control to, for example, either a second step 520, a fifth step 550, or a sixth step 560. Consider the path whereby control passes from the first step 505 to the second step 520. The second step 520 receives an acknowledgment packet over the CTI interface 155. The received packet preferably contains an internet address. With this internet address available, control passes from the step 520 to the third step 530 which passes the received internet address to a protocol stack which in turn establishes an internet connection with the remote CTI server 100 or the remote peer 102. Ideally, the internet connection is a TCP/IP stream socket established across the Internet, although other configurations are possible. Once the connection is established, control then passes to a fourth step 540 which uses the internet connection to pass data, preferably between application processes residing on the smart telephone 115 and the remote CTI server 100, or the peer 102. The established internet connection is a co-socket to the point-to-point PSTN telephone connection used to receive the server's internet address. Note that if control transfers from the first step 505 to the second step 520, the first step 505 only must transmit enough information to prompt the distant end to send an internet address. It is contemplated by the present invention that in such a situation, the first step 505 could be eliminated altogether by having the distant end transmit an internet address to all callers, thereby simplifying call processing.

Next consider the method 500 of FIG. 5 whereby control passes from the first step 505 to the fifth step 550. In the fifth step 550, an entire SYN sequence is exchanged using a point-to-point PSTN connection between the smart telephone 115 and either the remote server 100 or the peer 102. This SYN sequence is used to establish an internet connection. This internet connection, as discussed above, is a co-socket. Once the SYN segment exchange is completed, control is transferred to the fourth step 540 which uses a separate link layer interface to connect to the internet. This separate link layer interface is connected to an internet and is also called a "network interface." The separate link layer interface connected to an internet is different from the telephone connection. Thus, the point-to-point telephone connection may continue to be used or may be dropped if desired and communication may take place only over an internet. In the case of peer-to-peer communications, for example, it may be desirable for users to converse over the PSTN link and to exchange multimedia data over the co-socket.

Consider now the method 500 whereby control passes from the first step 505 to the sixth step 560. In the sixth step 560, at least one SYN acknowledge packet (which is typically the first part of a connection establishment sequence) is received over the CTI interface 155. If the path involving the sixth step 560 is selected, the first step 505 will preferably send the first SYN segment in the internet socket establishment sequence. Once at least one SYN acknowledgment packet is received in the sixth step 560, control passes to a seventh step 565 which continues to exchange any remaining SYN segments over a separate link layer interface connected to the internet 110. Once the internet co-socket connection is established, control passes to the fourth step 540 which allows application processes residing in the smart telephone 115 and the remote CTI server 100 or peer 102 to exchange information.

Figure 6:
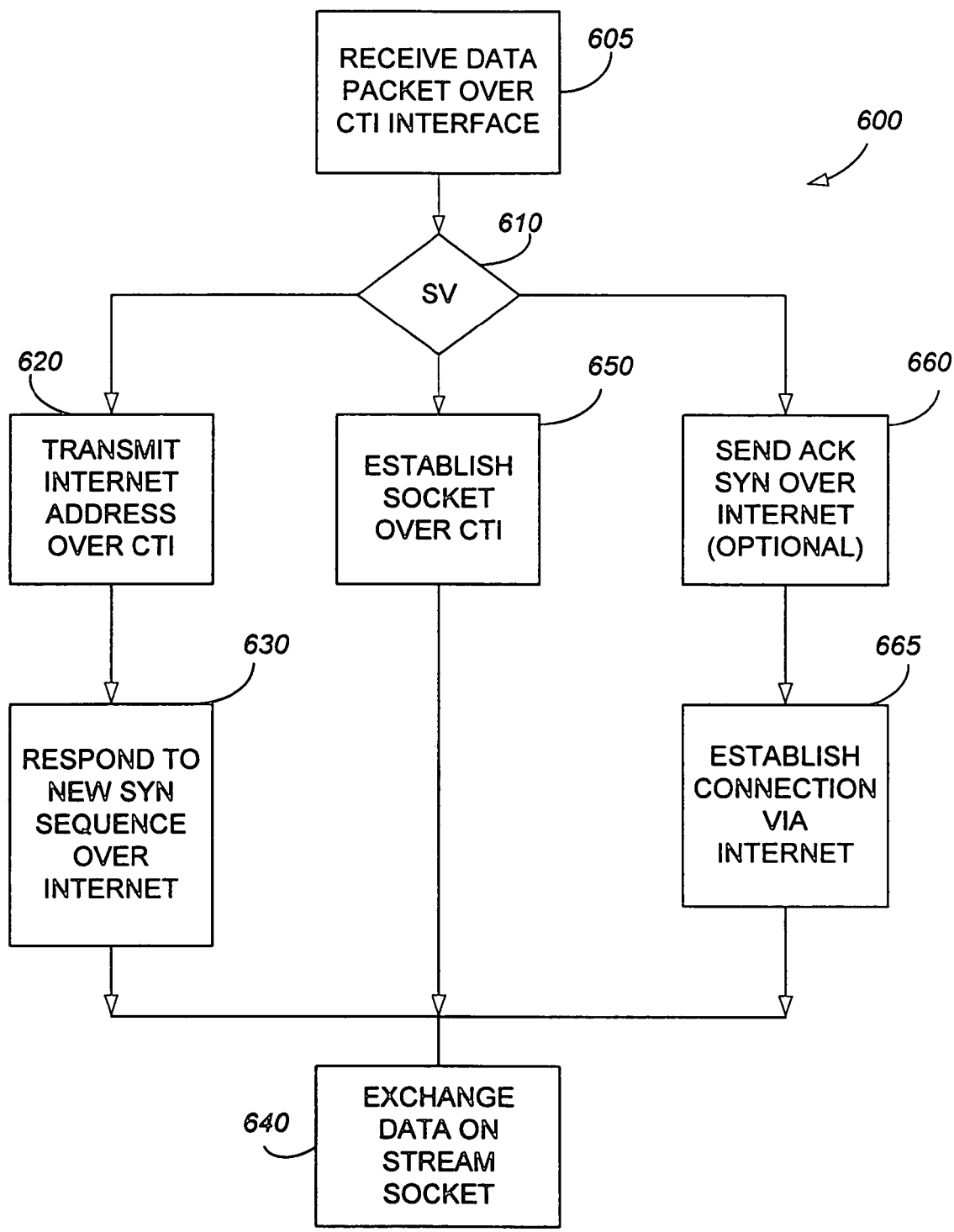
FIG. 6 is a flow chart illustrating a complementary method of processing utilized by a called device to respond to and participate in the establishment of a co-socket in accordance with the method of FIG. 5.

Referring now to FIG. 6, a method 600 is illustrated for establishing an internet co-socket at a remote station via a separate point-to-point PSTN connection. This method is practiced by a receiving (i.e., callee) side of a connection such as the CTI server 100. Additionally, this method 600 interacts with the previously described method 500 (FIG. 5) to enable multimedia phone calls which route voice traffic over the PSTN and data traffic over an internet. In the exemplary embodiment discussed in connection with the method 500, the method 600 is practiced by the CTI sever 100 or the peer 102 upon receipt of a connection request from smart telephone 115. As part of the method 600, a first step 605 is carried out to receive the SYN segment sent from the first step 505 of the method 500 as placed by the smart telephone 115. In the first step 605, a SYN segment is received from the distant end via a CLID packet, touch tones, speech, or other suitable transmission format.

Upon completion of the first step 605 of FIG. 6, control passes to an options decision point 610. The options decision point 610 may represent a selection operation or may represent a hard-wired transfer of control to, for example, to either the a second step 620, a fifth step 650, or a sixth step 660. Consider the path whereby control passes from the first step 605 to the second step 620. The second step 620 responds to an internet address query received in the first step 605 and transmits an acknowledgment which is preferably an internet address over the CTI interface 125. Once this internet address information has been transmitted, control passes from the second step 620 to the third step 630 which represents a listening server side internet connection preferably corresponding to the transmitted internet address. The third step 630 is used to perform the server side protocol of a client-server connection establishment exchange with the remote client who received the appropriate internet via the CTI interface. For example, the smart telephone 115 calls the CTI server 100 or the peer 102 of FIG. 1 and establishes a co-socket. Once the connection is established, control then passes to a fourth step 640 which uses the internet connection to pass data, preferably between application processes residing on the CTI server 100 and smart telephone 115. If this method is practiced by a peer device 102, then a peer-to-peer connection establishment protocol may be employed similarly to a client-server protocol, or the peer may act as a server in the connection.

Next consider the method 600 of FIG. 6 whereby control passes from the first step 605 to the fifth step 650. In the fifth step 650, an entire SYN sequence is exchanged using a point-to-point PSTN connection between the called CTI device and the calling smart telephone 115. This SYN sequence is used to establish an internet connection. This internet connection, as discussed above, may be termed a co-socket connection because it requires a PSTN (or PBX) co-channel to establish it. Once the SYN sequence is completed, control is transferred to the fourth step 640 which uses a separate link which connects to the internet. Thus the point-to-point connection may continue to be used or may be dropped and communication may take place over the internet connection. In the case of peer-to-peer communications, it may be desirable for two or more parties to converse over the PSTN link and to exchange images and other forms of data over the established co-socket connection.

Consider now the method 600 of FIG. 6 whereby control passes from the first step 605 to the sixth step 660. In the sixth step 660, at least one SYN acknowledge packet which is part of a connection establishment sequence is transmitted over the CTI interface 125. If the sixth step 660 is selected, the first step 605 will preferably receive at least one SYN segment in an internet socket establishment sequence. Once at least SYN acknowledgment packet is sent in the sixth step 660 over the internet, control passes to a seventh step 665 which continues to exchange SYN segments over a separate link connected to the internet 110. Once the internet co-socket connection is established, control passes to the fourth step 640 which allows application processes residing in the called computer to exchange information with the application processes in the calling computer. For example, the called CTI server 100 or peer 102 may exchange information with the calling smart telephone 115.

The method 600 also contemplates an alternative co-socket establishment procedure. In the alternative procedure of the method 600, the data packet received in first step 605 is preferably a CLID data packet. The CLID data packet may comprise a caller's name and telephone number as is common in the art. Also, the received information may comprise a modified CLID packet which includes a caller's internet socket address suitable for popping a screen of information on the caller's computer screen. Apparatus to provide such an internet socket address in a CLID data packet is discussed in connection with FIGS. 10–13. If the CLID data packet does not include an internet socket address, then the first step 605 is operative to perform a database translation to convert the CLID information to a caller's internet socket address. The database used to perform this translation may be local or remote. That is, the step 605 may involve performing a database query to a remote database accessible through the internet. A remote database which may be used for this purpose is shown as the database 112 in FIG. 1. In the alternative procedure of the method 600, control next passes from the first step 605 directly to the step 665, bypassing the optional step 660. In the step 665, an internet socket is established from a computer practicing the method 600 back to a computer controlled by the caller. The step 665 is preferably performed over a link layer interface other than the telephone connection on which the CLID data packet was received. This alternative procedure has the advantage that a caller can call from a standard telephone and still receive a screen of information from the callee. For example, a caller can call from a standard office telephone and receive a screen of information from the callee. Similarly, a caller can initiate a call from a standard telephone in a home and receive a screen of information on a computer connected to a second line, a CATV terminal, or a Web-TV internet appliance connected to a television set.

The method 500 and the methods 200, 500, and 600 may all be advantageously implemented via a computer program which executes on a processor coupled to a memory. The same holds true for the methods 900, 1100, 1300, and 1400 which will be subsequently discussed. In most cases these methods may be implemented using an application program as defined below. A computer program is defined herein generally as a sequence of instructions which executes on a processor. Typically the computer program is stored in a semiconductor memory, and instructions are read by a processor from the memory in sequence. The processor typically executes the instructions sequentially in the order in which they are read from memory. In modern processors with out-of-order execution, slight variations from strict sequential orderings are allowed to provide speed advantages. A computer program is represented at its lowest level in machine language. Machine language is a representation of instructions as operation codes (opcodes) which are embodied as binary words consisting of zeros and ones. Programs are more conveniently written in a high level programming language such as C and Pascal are even easier. High level programming languages are well known in the art and are used to construct high level instruction sequences wherein each high level instruction may be translated into a collection of machine language instructions.

Most computer systems supply an operating system as an interface between a user's program and a computer's hardware resources. Well known operating systems include UNMX™ as originated from AT&T Bell Labs, and Windows95™ and Windows NT™ as produced by Microsoft Inc. A large body of literature and documentation exists to describe the functionality of operating systems at all levels. An operating system is a computer program which provides driver programs and programs which load and execute other programs. Modern operating systems also typically provide mechanisms to allow different programs to communicate with each other.

When an operating system is present, application programs communicate with each other and with input/output devices using standard high level software interfaces. These interfaces are commonly known as application programmer's interfaces (API's). An API is accessed by an application through a so-called "function call." A function is a software routine which performs some specified action. A function call is a set of one or more instructions which sends a set of parameters to the function and invokes the function. For example, if a program is written in C and runs on a personal computer running Windows95™, an API may provide a function to allow an application program to access a protocol stack coupled to an internet. A telephony API may also be supplied to allow an application program to interact with a telephone interface. For example, telephony API functions to pick up a telephone line or to digitize a signal received on a telephone line may be supplied as a function associated with a given API. Operating systems often provide API's as a library functions. An example of an API implemented as a library of functions is the WinSock API which supports Windows95™ and related Windows™ based operating systems. The WinSock API provides roughly fifty function calls, and hence the WinSock system includes a library of fifty functions. It is important to note a given application program may be written to include a call to an API. Also, an operating system may be developed which provides an API as a part of its environment so applications which call the API may execute properly.

Figure 7:
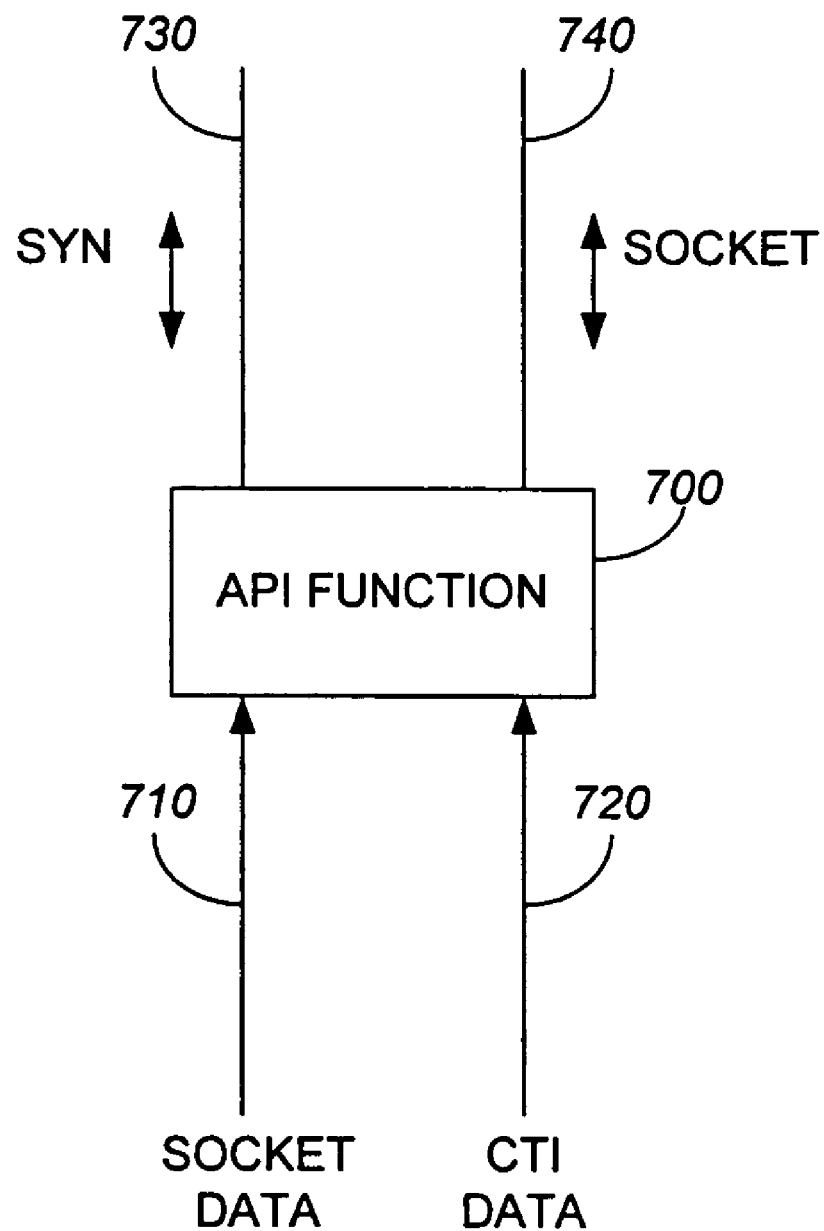
FIG. 7 is a block diagram illustrating an application programmer interface used to interface to a protocol stack having co-socket establishment capabilities.

Referring now to FIG. 7, an application programmer's interface (API) function 700 according to the present invention is illustrated. This function may be included as a part of an operating system and may serve as a gateway between an application process and an operating system process which implements a protocol stack. The inventive API includes two essential inputs. A first input 710 receives information relating to the establishment of an internet socket address, while a second input 720 receives information relating to a PSTN telephone number and/or other CTI related information used for signaling on a CTI link provided by a point-to-point PSTN connection. The API provides access to a protocol stack which may transmit and/or receive data on two separate link layer interfaces. A point-to-point telephone oriented link layer 730 is coupled to a telephone line. An internet layer link interface 740 is coupled via the accessed protocol stack to the internet 110.

The inventive API may be used to provide an interface between an application layer process and a protocol stack in devices such as the smart telephone 115, the CTI server 100, or various versions of the peer devices 102. The API 700 of FIG. 7 may be used as a means to program the caller side method 500 or the callee side method 600 previously described. The API 700 is operative to accept both CTI call establishment information as well as internet socket establishment information. This socket establishment aspect of the API 700 provides a functionality associated with a network interface API. A network interface API provides an interface between an application program process and a protocol stack process which is coupled to an internet. Common network interface APIs include the Sockets API and the WinSock API. The API 700 enables an application or operating system program to interact with a CTI enabled protocol stack used to both set up a point-to-point telephone call and an associated co-socket connection. Utilizing the methods 500, 600 previously described (and variations thereof), the API 700 is operative to transmit internet co-socket establishment data over the point-to-point telephone link layer interface 730, and to perform subsequent co-socket communications over the internet link layer interface 740.

Figure 7A:
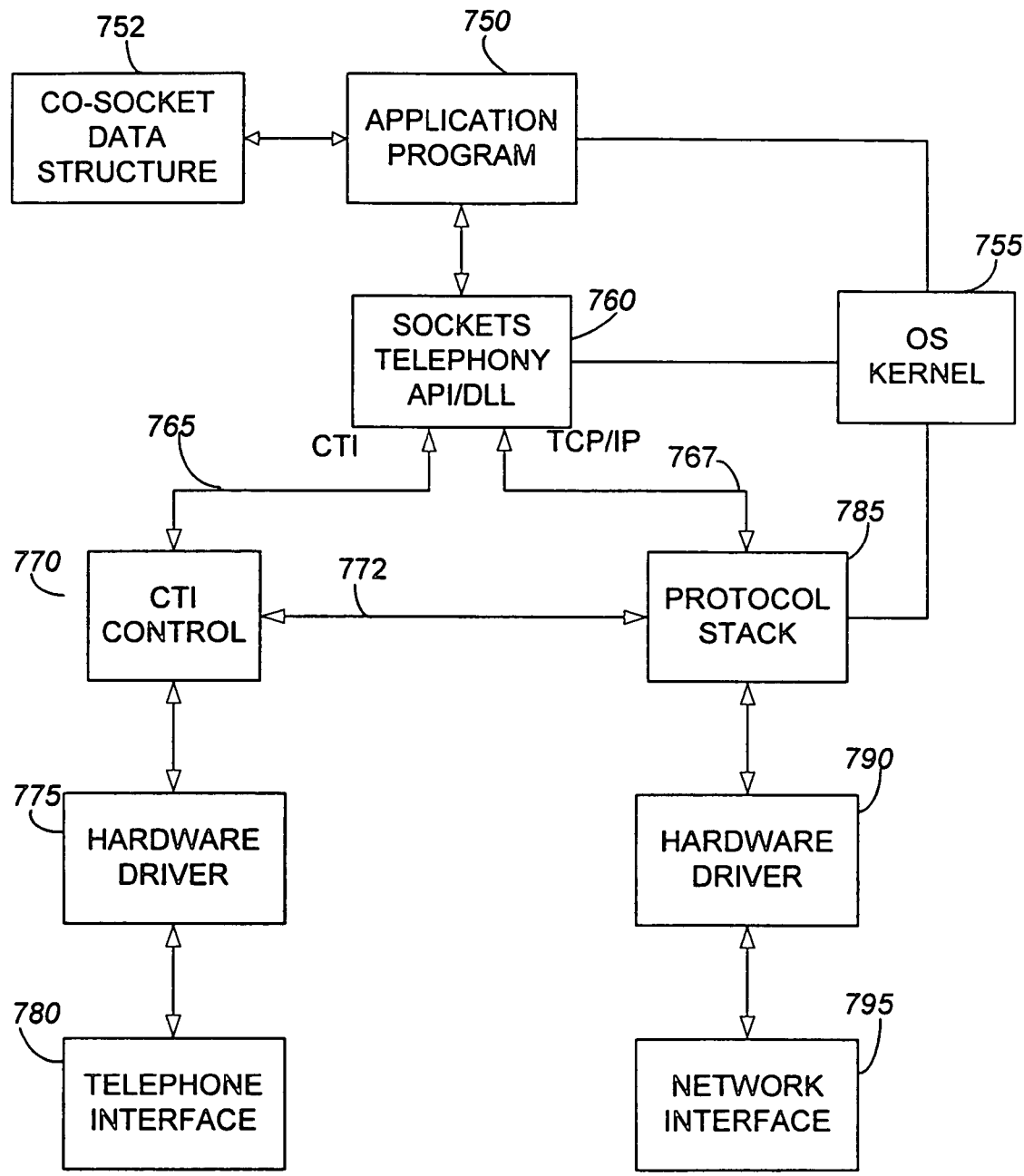
FIG. 7a is a block diagram illustrating one embodiment of a software architecture for use on a smart telephone or computer according to the present invention.

Referring now to FIG. 7a, a preferred embodiment of a software architecture to be run on a central processing unit (CPU) in a smart telephone or CTI server is presented. An operating system kernel 755 controls various processes which share time on the CPU. The operating system kernel 755 is coupled to an application program 750, a sockets-telephony API 760, and a protocol stack 785. The coupling between the operating system kernel 755 and the application program 750 is implemented as a task control block data structure. The task control block data structure is a data which holds task (i.e. process) related information. Task control block data structures are maintained for one or more resident processes and are manipulated by the operating system kernel 755. As is well known in the art, a process is an instance of a computer program represented by an execution flow. When the process is inactive, a set of process related variables such as a machine state relating to the process are stored in a task control block. The operating system kernel 755 performs task switching by moving the process from a dormant state where it is stored in the task control block to an active state where it is allowed to run on the CPU. By the same token, the coupling between the operating system kernel 755 and the protocol stack 785 is implemented using a second task control block. Depending on the embodiment, the protocol stack may itself be implemented as one or more processes, each of which are coupled to the operating system 755 via their own task control blocks. The operating system kernel 755 is coupled to the sockets-telephony API 760 by virtue of the fact that the sockets telephony API supplies an interprocess communications function which interacts with kernel level data structures and related communication mechanisms. In some cases the protocol stack 785 may be implemented as a part of an operating system associated with the operating system kernel 755.

The application program 750 is coupled to a co-socket data structure 752. The application program is said to "own" the co-socket 752 when the program makes a function call to create the co-socket. A process which owns the co-socket is able to use the co-socket to communicate with a process on a remote computer. A remote computer may comprise a smart telephone as described hereinabove. The co-socket data structure is embodied within a memory as a collection of information bits. The co-socket data structure includes a standard socket data structure with the possible addition of extra fields for telephone connection related parameters as discussed below. The application program 750 is also coupled to the sockets-telephony API 760. This coupling is implemented within the application program 750 as a function call to a sockets-telephony API function. At run time, the coupling is implemented via a function call which references a function stored in a runtime library. A runtime library is a collection of functions which may be accessed at runtime. The sockets telephony API 760 is coupled to a CTI control module 770 via a coupling 765 which carries telephone connection related information such as connection commands and digitized telephone signals. The CTI control module 770 is coupled to a first hardware driver routine 775. The first hardware driver routine 775 is coupled to a telephone interface 780. The sockets telephony API 760 is also coupled to a protocol stack 785 via a coupling 767 which carries network connection related information such as socket addresses and internet data. The protocol stack 785 is coupled to a second hardware driver routine 790. The second hardware driver routine 790 is coupled to a network interface 795. Depending on the embodiment, a coupling 772 may be implemented to allow the protocol stack 785 to communicate with the CTI control module 770. This is preferably implemented in the form of a function call or via an interprocess communications mechanism supplied by the operating system. When the coupling 772 is implemented, the coupling 765 becomes optional since the sockets-telephony API 760 may pass both socket related and telephone connection related parameters to a transport layer of the protocol stack, and the transport layer can couple link level information to both the telephone interface 780 and the network interface 795.

It should be noted the telephone interface 780 and the network interface 795 represent link layer interfaces. As discussed above, a link layer interface is defined as a physical layer interface which carries signals, plus a signaling format such as a framing protocol. In a preferred embodiment the physical layer interfaces of the telephone interface 780 and the network interface 795 are different. In some embodiments, such as those involving an integrated services digital network (ISDN) line, a DSL, or a Ti line for example, the two link layer interfaces 780 and 795 may be carried on the same physical connection. In the preferred embodiment, the telephone interface 780 is coupled directly to a remote computer via a point-to-point telephone connection, and the network interface 795 is coupled to the remote computer via an indirect connection through an internet.

The sockets-telephony API function module 760 itself includes structural features. The module 760 includes a first software sub-module which is coupled to the CTI control interface 770 which is itself operably connected to the telephone interface 780. The module 760 also includes a second software sub-module coupled to the first software sub-module. The second software sub-module is coupled to the co-socket data structure 752. Preferably, this coupling is implemented by having the application program 750 pass a pointer to the sockets-telephony function 760. The module 760 may optionally also include a connection to the protocol stack 785.

Next consider the operation of the software architecture as illustrated in FIG. 7*a*. Upon application of power to the system, the operating system is loaded into memory at boot-time from a disk. In alternative embedded embodiments, the operating system may be resident in a semiconductor memory such as ROM when power is turned off, in which case the operating system is not loaded from disk. Once the operating system is loaded, control passes to the operating system kernel 755. The operating system kernel loads various processes to run such as the application program 750 and the protocol stack 785. The application program 750 makes function calls to the sockets-telephony API 760 in order to establish a communication socket with a remote computer. For example, using well known concepts of UNIX™ sockets and Windows™ Sockets (WinSock) API's, a function called "socket" is called to create a socket data structure. The socket function returns a pointer to the created socket data structure. A socket data structure is an endpoint for communication and provides a means to allow the application 760 to send and receive messages with a remote computer. An alternative function called "co-socket" may be used create and return a pointer to the co-socket 752. The co-socket 752 contains the same information as a socket data structure plus information relating to a telephone connection. A process which makes a function call to the co-socket function is said to "own" the co-socket. The function owning the co-socket is able to use the co-socket for as a data structure in support of network communication. Further details describing the use of the co-socket data structure 752 are discussed immediately below.

Consider the case when the application program 750 wishes to establish a connection with a remote computer. Once the application program 750 has obtained a socket or co-socket data structure as discussed above, the application program 750 calls a "connect" function. A connect function, as is also known in the sockets literature, is a software function which accepts as an argument a pointer to a socket data structure, an address of a remote socket, and a length of the remote socket address. In accordance with the present invention, a new type of connect function called a "co-socket connect" function is supplied which takes an additional argument of a telephone number. In a preferred embodiment, the co-socket connect function according to the present invention only requires a pointer to a socket data structure and a telephone number of the remote computer to be sent as input parameters. In an alternative preferred embodiment, the co-socket connect function only requires a pointer to the co-socket data structure 752 as an input parameter. The co-socket data structure 752 then contains the same information as a standard socket data structure plus a field relating to a telephone connection. For example, the field may contain a telephone number to be dialed to establish a connection with a remote smart telephone or CTI server. Once the application program 750 calls the co-socket connect function as provided by the sockets-telephony API 760, the co-socket connect function is operative to direct a data segment to be sent to the remote computer by dialing the telephone number of the remote computer and sending a data segment to the remote computer via the dialed telephone connection. Preferably, the data segment is a SYN segment used in the establishment of a TCP/IP stream socket in accordance with the method 600. In that case, a SYN segment is routed over the telephone interface 780 via a point-to-point connection to the remote computer, and a TCP/IP co-socket is established to support the call using the network interface 795. In accordance with the present invention, the sockets-telephony API 760 need only be aware of the remote computer's telephone number in order to establish an internet co-socket connection with the remote computer. In practice, this sequence of events may be initiated when a caller using the smart telephone 115 dials a phone number which is answered by the CTI server 100.

Next consider the case where the application program 750 is configured to receive incoming phone calls. For example, a CTI server application program may be designed which receives incoming telephone calls from clients and sets up co-sockets in response thereto. In this case the application program 750 calls a socket function to establish a socket data structure or the co-socket data structure 752. As discussed above, the co-socket data structure 752 differs from a standard socket data structure in that it holds additional information relating to a telephone connection. Also, the co-socket 752 be a communication end point for a co-socket established at least partially over a point-to-point telephone connection. Next the application program 750 calls a co-socket listen function. Listen functions are well known in the sockets art and are used by servers to listen for client requests over a socket connection. In accordance with the present invention, the sockets-telephony API 760 includes a co-socket listen function which listens for incoming telephone calls carrying co-socket establishment segments. When a telephone call is received over the telephone interface 780, the listen function is triggered into an active state. When a call is received, the listen function causes the CTI control module 770 to process an incoming signal to determine whether a SYN data segment has been received. If a SYN data segment has been received, the CTI control module 770 passes the SYN segment to the protocol stack 785 via the coupling 772. The protocol stack 780 thus uses the telephone connection as a second link layer interface over which to receive incoming SYN segments. While it is anticipated that other types information may advantageously be passed over the telephone connection to the protocol stack, the transmission of SYN segments is viewed as the preferred use. Hence the listen function is operative to receive incoming phone calls and to set up co-sockets across an internet in response thereto, just as a conventional listen function does using only the network interface 795. As discussed above, similar structures using session layer interfaces are also within the scope of the invention. These embodiments may use session layer packets different from SYN segments and session-layer versions of a co-socket data structure.

The software architecture of FIG. 7a illustrates an aspect of the present invention relating to the protocol stack 785. The protocol stack 785 includes the coupling 772 to the telephone connection oriented link layer interface 780 and a coupling to the network connection oriented link layer interface 795. The protocol stack may be passed a first input relating to a socket data structure and a second input relating to a telephone connection. When implementing a connect function, the second input preferably includes the telephone number of the remote computer to which the protocol stack is directed to connect. Alternatively, the first and second inputs may be embodied within in the co-socket data structure 752. In operation, the protocol stack 785 receives a pointer to the co-socket 752 as an input parameter. The co-socket 752 contains the first and second inputs. Next the protocol stack causes the telephone number to be dialed, and then transmits a SYN segment over the established point-to-point telephone connection. The method 600 is preferably employed by the protocol stack to establish a co-socket connection with the remote computer. Alternatively, the telephone number may be directed to be dialed using the coupling 765, in which case the co-socket data structure 752 need only contain a telephone connection identifier. The protocol stack thus transmits the SYN segment over the designated connection 780 and preferably implements the method 600. Once the co-socket is established, subsequent internet communication occurs over the network connection 795.

When implementing a listen function, the second input preferably includes a telephone line identifier for one or more telephone lines over which telephone calls requiring co-socket services may be received. The co-socket listen function is passed a pointer to the co-socket 752 which includes a socket data structure plus a telephone line identifier. When the designated telephone line receives an incoming call which carries a SYN segment, the CTI control module 770 signals the event to the protocol stack 785 via the coupling 772. The protocol stack 785 is operative set up a co-socket for subsequent communication over the network connection 795. This connection is set up in response to the SYN segment received on the telephone interface 790. The protocol stack 785 preferably implements the method 500 to establish the co-socket connection with the remote computer in response to the incoming call. If the coupling 765 is used, the application program may be involved in routing the received SYN segment back to the protocol stack via the coupling 767.

Figure 8:
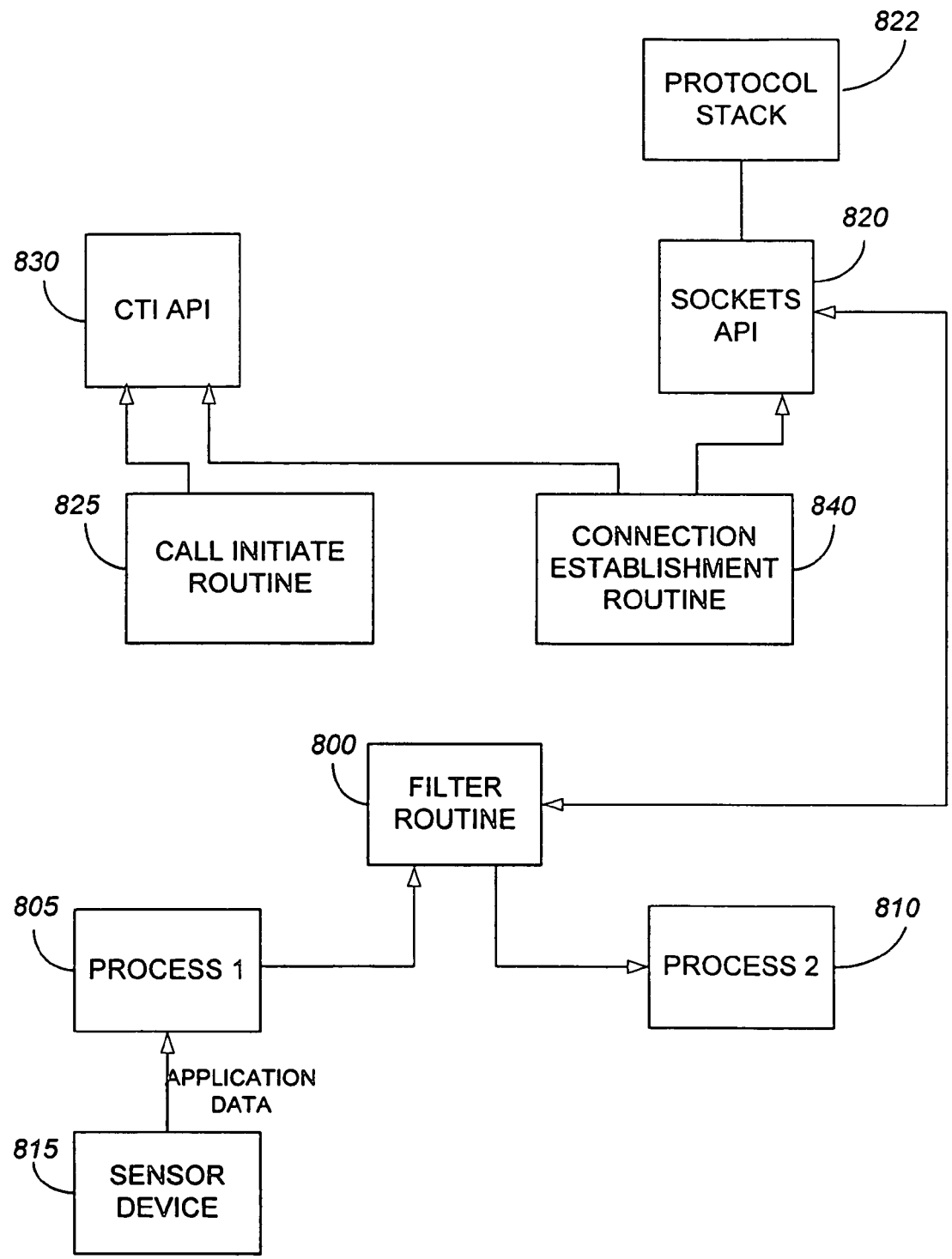
FIG. 8 is a block diagram illustrating a filter program according to the present invention which is operative to intercept bytes within an information stream and transmit a copy of the intercepted bytes across a socket or co-socket.

FIG. 8 illustrates a filter program according to the present invention which enables users to, inter alia, share images and other forms of computer data over a co-socket internet connection while conversing over a PSTN telephone connection. A filter routine 800 is coupled via software connections to a first process 805 and a second process 810. The filter program is also coupled to a sockets API 820 which provides access to a protocol stack 822. The process 805 may receive input from various sources to include a sensor device 815. The sensor device may include a digital camera, a keyboard, a mouse, and/or any other devices which may be connected to receive input. Resident in the same computer is a "call initiate" routine 825 which is coupled to a CTI API 830. The CTI API 830 may optionally receive an input from a connection establishment routine 840. The connection establishment routine 840 is coupled to provide input and make calls to the CTI API 830 and the sockets API 820.

The inventive filter is operative to intercept at least a portion of a data stream sent from the first process 805 to the second process 810 and to route the intercepted data across a co-socket maintained by the protocol stack 822. It is understood that the filter 800 may be coupled directly to the protocol stack 822 without using an API, but an API represents a preferable approach. To understand the function of the filter 800, consider the following example. Assume that the first process 805 is a word processing program. Assume that the second process 810 is a windows process which receives data from the first process and displays the received data in a window on a local computer display screen. In such a situation, the filter routine 800 copies this data stream and preferably formats it into an application layer packet stream suitable for transmission to an application layer program which resides on a remote computer coupled to an internet co-socket connection as managed by the protocol stack 822. In a preferred embodiment, the co-socket is established using the method 500 or the method 600. However, the CTI API 830 and the sockets API 820 may also be merged using functions similar to the function 700.

The preferred use of the filter 800 is to allow remote users to converse on a communications device (such as a telephone) while sharing computer data via an internet co-socket. Referring again to the previous example, remote colleagues may be discussing a document over the telephone. Since the filter program intercepts and copies the data stream sent from a word processor to a windows display process, the copied data stream will contain display information needed to display the word processor data on the remote computer's screen. Hence the filter sends this data across the co-socket to the remote site so the colleague on the remote end of the phone line may view and discuss the same word processor display window. As discussed previously, this type of data and media sharing is known as data conferencing. Hence the filter 700 enables a mixed mode of data conferencing whereby preferably voice is carried over a toll quality PSTN circuit and other forms of media and data are transported across an internet via a co-socket.

Figure 9:
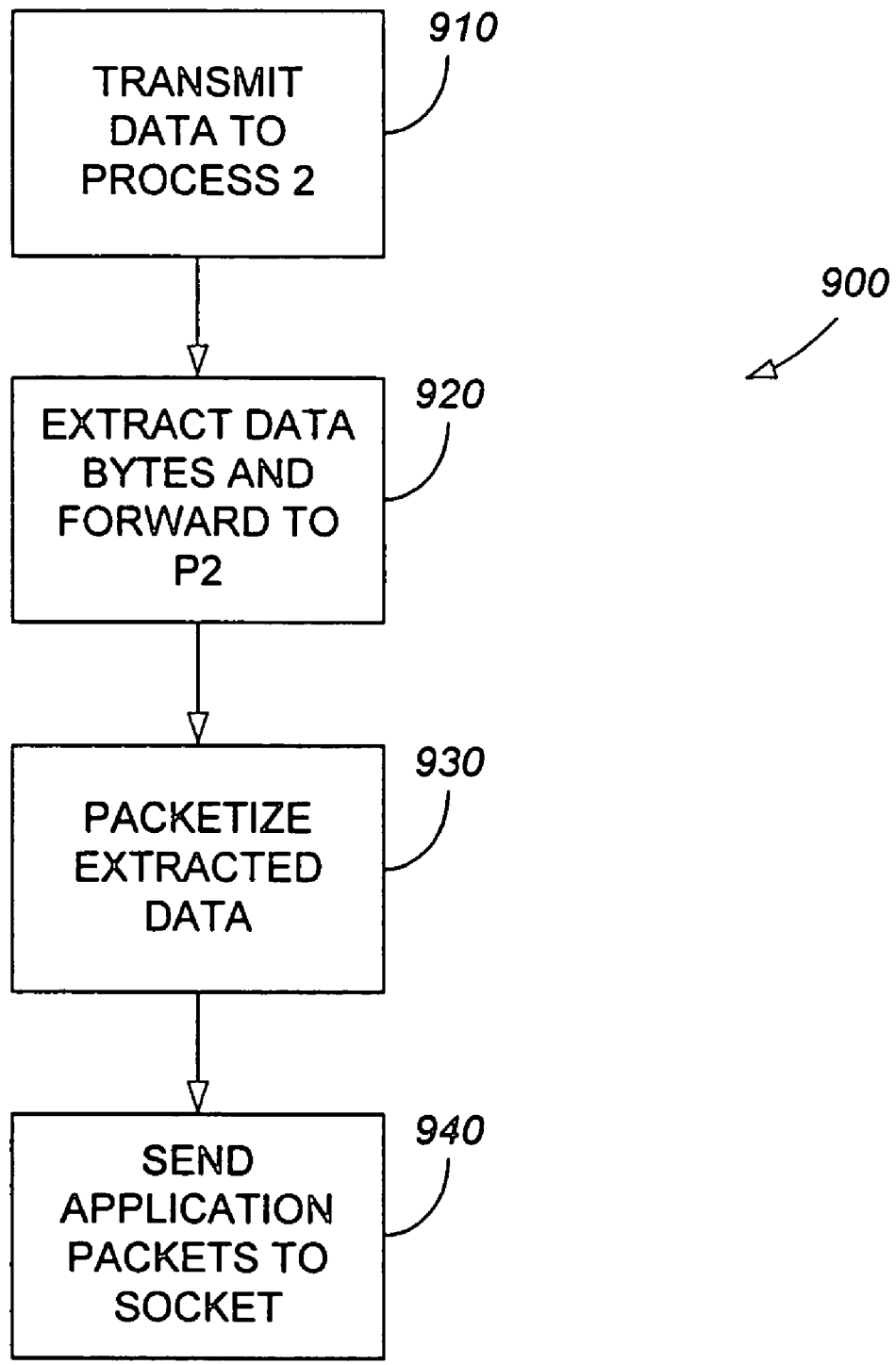
FIG. 9 is a flow chart illustrating a method of sharing screen information with a remote computer using a filter module.

FIG. 9 illustrates a method of processing 900 carried out within a computer or smart phone. In a first step 910 a first process transmits a data stream to a second process. In some embodiments, the data stream may be transmitted from a first thread to a second thread, from a first module to a second module, or most generally from the domain of a first set of instructions to the domain of a second set of instructions. As is well known in the art, a "thread" is an execution flow which may exist independently from others. In many computer systems, a process may have one or more threads of execution. A second step 920 is preferably implemented using a third process separate from the first and second processes. This third process is a preferably a filter process interposed between the first process and the second process. Control in the filter process next passes to a third step 930 which packetizes the intercepted information stream. The packetized data is preferably packetized into an application layer packet stream formatted for use by an application program residing on a remote computer (which is coupled via a co-socket). Control next passes to a fourth step 940 which sends the packetized data stream to the co-socket. This method enables real-time data conferencing to occur by sending voice data over a PSTN voice circuit and image or other forms of computer data across an internet co-socket.

Figure 10:
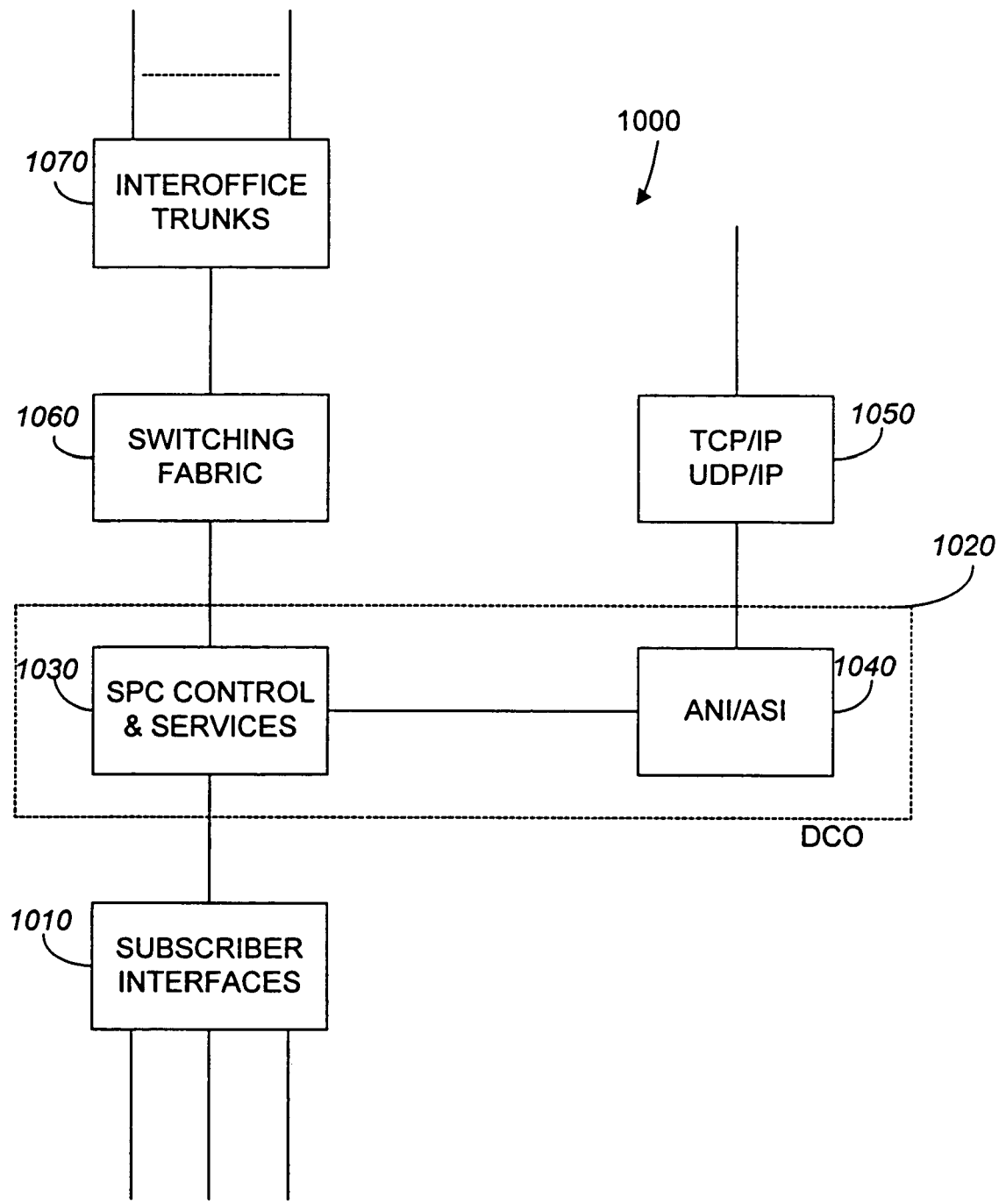
FIG. 10 is a block diagram of one embodiment of a central office switching apparatus according to the present invention, which is used to perform ANI to co-socket address database translations.

FIG. 10 illustrates an exemplary central office switching arrangement 1000 in accordance with the present invention. A subscriber line interface circuit module is preferably coupled to fiber and cables carrying large numbers of twisted pairs which provide subscribers with local loop access to the PSTN. The signals carried on this wiring are typically digitized and multiplexed and coupled to a digital central office (DCO) 1020. The digital central office 1020 includes a stored program computer (SPC) module 1030 which executes a switch generic program providing digital control, network management, and other services. The SPC module 1030 is coupled to an automatic number identification/ automatic socket identification (ANI/ASI) data base and translation module 1040. The ANI/ASI database and translation module 1040 may be a part of the DCO and coupled to mass storage devices (not shown). Additionally, the ANI/ASI database and translation module may optionally be coupled to a TCP/IP protocol stack 1050, preferably via a sockets API (not shown). The DCO preferably includes a main communication data path and a signaling path which couples to a switching fabric 1060. The switching fabric 1060 couples to an interoffice trunk interface module 1070 which couples long distance traffic out of the local access transport area (LATA).

The central office switching arrangement 1000 of FIG. 10 is operative to switch intra-LATA traffic as well as inter-LATA traffic as is well known in the art. The central office switching arrangement preferably uses a standard SPC DCO architecture which is operative to perform time division multiplexing of subscriber channels and to provide services such as ANI/CLID, automatic message accounting, and maintenance and control functions. The switching fabric 1060 may be implemented using any one of a number of well understood switching fabric architectures such as space-time-space, time-space-time, or shared memory ATM-packet, for example. Since central office switching is a mature technology and well known to those of ordinary skill in the telephonic arts, these aspects will not be discussed further herein. Of note, however, is the ANI/ASI database and translation module 1040 associated with the central office switch in the present invention. The ANI/ASI module is operative to translate ANI or related CLID information available to the DCO 1020 into internet socket address information. This translation is carried out in the present embodiment statistically by sending a database query to a mass storage unit which uses the ANI or CLID data as a key and returns an internet socket address. At any point herein, the term "ANI" may be interpreted to mean "ANI or CLID" data. Typically ANI data is used within a telecommunications network for billing while a CLID packet is delivered to the user. The issue of importance for use herein is that ANI and CLID both to carry information indicative of the identity of the caller. The process of converting ANI data to an internet socket address is called ASI, for "automatic socket identification." The translation is preferably carried out dynamically by maintaining socket connections to users or connection servers via an internet coupled via the protocol stack 1050, although other approaches are possible. When a number is to be checked, a dynamic database is accessed which keeps track of users currently connected with active internet connections. In the dynamic translation scenario, when a user logs onto an internet connection, an application program resident on the user's computer or ISP automatically establishes a socket connection for co-socket use and forwards this socket number to an internet address associated with the central office 1000. The central office 1000 performs the ANI/ASI translation and preferably either replaces CLID information in PSTN data packets with ASI data, or else appends the ASI data to the CLID data so both the caller's number and internet socket address are available to the called end of the telephone connection.

In most systems, the PSTN data packets correspond to SS7 packets. SS7 signaling, as is well known, uses common channel signaling to perform call set-up and call termination. This system differs from prior art systems in that the database translation is used to identify an active internet port address such as used in a PPP connection to allow the callee to return the call by popping a screen of information on the caller's computer screen using the co-socket address information found in the database translation. While prior art systems provided static information such as e-mail, FTP, and web-page URL information within CLID packets, the present invention provides socket port numbers to enable real-time multimedia communications via co-sockets. It should be noted that while the switching arrangement 1000 has been discussed in connection with a central office switch within the PSTN, the same architecture may be applied to the design of a PBX. In general, a telephone switch may be a PBX, central office switch, long distance switch, or a switch involving internet telephony used to switch internet calls. The apparatus 1000 may be applied in general to a telephone switch.

Figure 11:
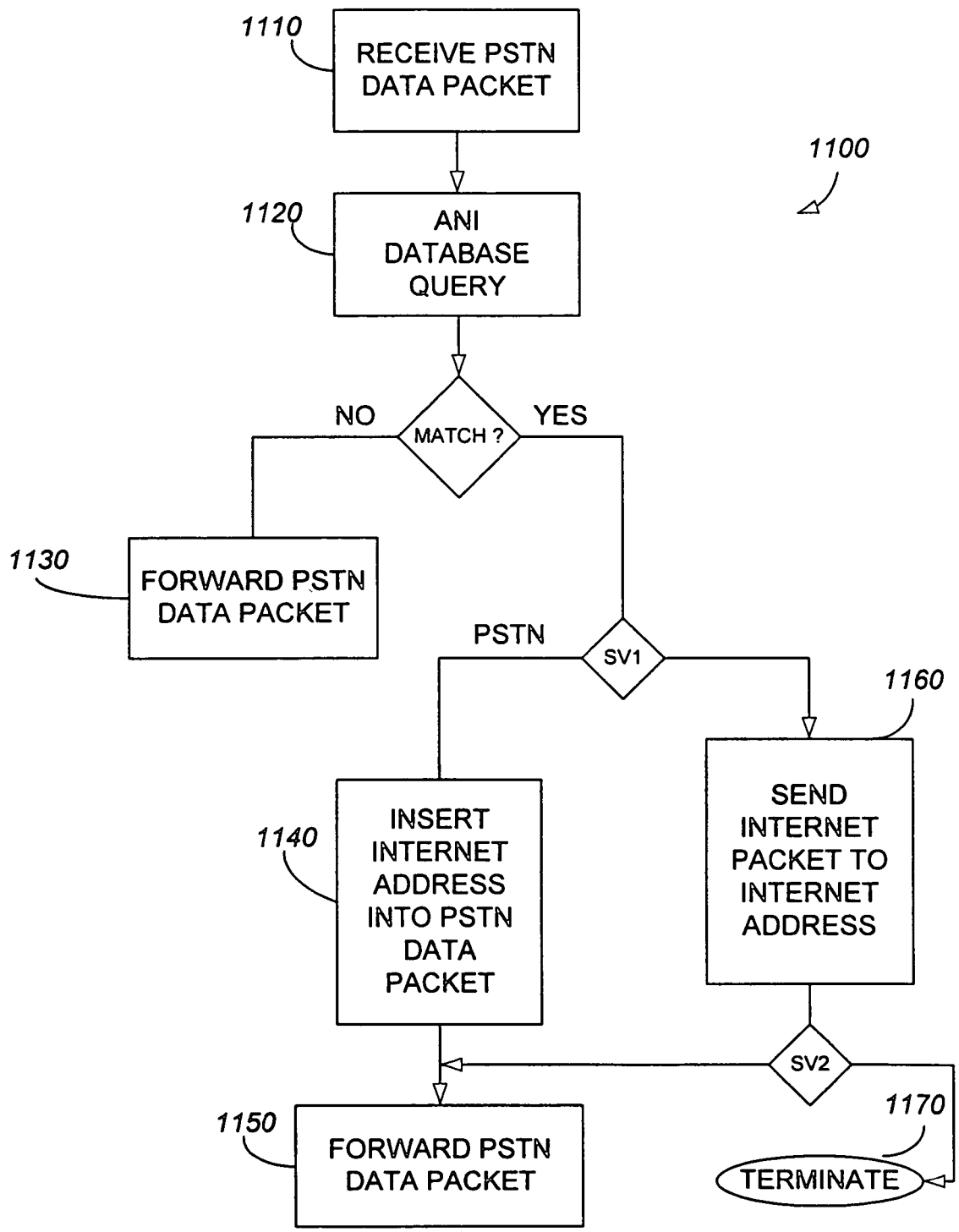
FIG. 11 is a flow chart illustrating a method of performing caller identification to co-socket address database translations.

FIG. 11 illustrates a method 1100 practiced primarily by a local switching office employing the central office switching arrangement 1000. This method may also be practiced more generally by a telephone switch. In a first step 1110, a PSTN data packet is received containing ANI or CLID information. This data packet is preferably a call-set-up related data packet which is received before the actual voice circuit is established. In some cases the received data packet uses an SS7 structure, and in other cases it uses a different structure for the particular central office in use. After the PSTN data packet is received containing the caller's identification information in the first step 1110, control passes to a second step 1120 wherein a database query is performed to associate the caller's identification information with an internet address which is preferably a TCP/IP stream socket or datagram socket address. As discussed previously, the database may be a static database maintained in a mass storage device, or may preferably be a dynamic database updated each time a user opens an active client internet session. An active client internet session may be, for example registered by an Internet server when a user has connected over a PPP connection. If no match is found associating the caller's number to an internet address, control passes from the second step 1120 to a third step 1130. In the third step 1130, a call set-up packet is preferably forwarded to the calling end containing only standard CLID information.

If a match is found in the second step 1120, control may pass to either a fourth step 1140 or a sixth step 1160. The decision as to which of the steps 1140 or 1160 is carried out is set according to a state variable SV1 which may represent a software variable setting or a hardwired setting. That is, in some embodiments, only one of the steps 1140 or 1160 may be available. If a match is found in the second step 1120 and the state variable SV1 is in a first position, control passes from the second step 1120 to the fourth step 1140. In the fourth step 1140, an internet socket address is inserted into a PSTN data packet for transmission to the called party. Control next passes from the fourth step 1140 to a fifth step 1150 which forwards the PSTN data packet for transmission through the PSTN. The PSTN data packet is preferably an SS7 call set-up packet carried over a common channel using common channel signaling. If a match is found in the second step 1120 and the state variable SV1 is in a second position, control passes from the second step 1120 to the sixth step 1160. In the sixth step 1160, a data packet is sent to the caller via an internet connection which is preferably the socket found in the ANI/ASI translation database step 1120.

Depending on a second state variable SV2 control may pass to different places after the step 1160. The state variable SV2 may represent a software bit field or a hardwire setting depending on the implementation. If the state variable SV2 has a first value, no further action is taken and the call set up process is terminated as illustrated in the termination oval 1170. If the state variable SV2 has a second value, control is passed to step the 1140 which behaves as discussed above. If the state variable SV2 has a third value, control passes to the fifth step 1150 which passes a PSTN data packet with no internet address information supplied.

Consider now some practical applications of the method 1100. Suppose a caller is to call a 1-800/888 phone number. Suppose the caller is calling from either a smart phone 115 or from an office with a separate phone line and internet connection. Suppose the caller also has registered for ANI/ASI service with the LEC. When the user places a call, a socket address is found in the database query step 1120. If the state variables are configured to pass control to the fourth step 1140, the caller's co-socket address will be provided in a PSTN call-set up packet which will be carried to the called 1-800/888 phone number's location. When the phone rings at the remote location, the caller's co-socket will preferably be made available along with CLID information. CLID information is delivered in a CLID packet which may be a part of an SS7 packet, some other form of PSTN data packet, or an emerging standard's internet telephony packet. At this point the remote 1-800/888 service provider may display a screen of information on the caller's computer and optionally reject the call. This saves the 1-800/888 service provider money and gives the caller a more friendly user interface than IVR voice prompts. The call center also may provide a web-call back timer according to the aspects of the present invention previously discussed in connection with FIG. 2, or may be used for peer-to-peer multimedia co-socket communication. If the state variables are configured to direct control to pass to the sixth step 1160, the ANI/ASI translation system may provide the called number's internet address back to the caller. In this way, the caller's computer may initiate a session with the called phone number's server. No PSTN packet need be forwarded across the PSTN in this case. In this mode of operation, the database query step 1120 must also locate the called number's internet address in the database.

Figure 12:
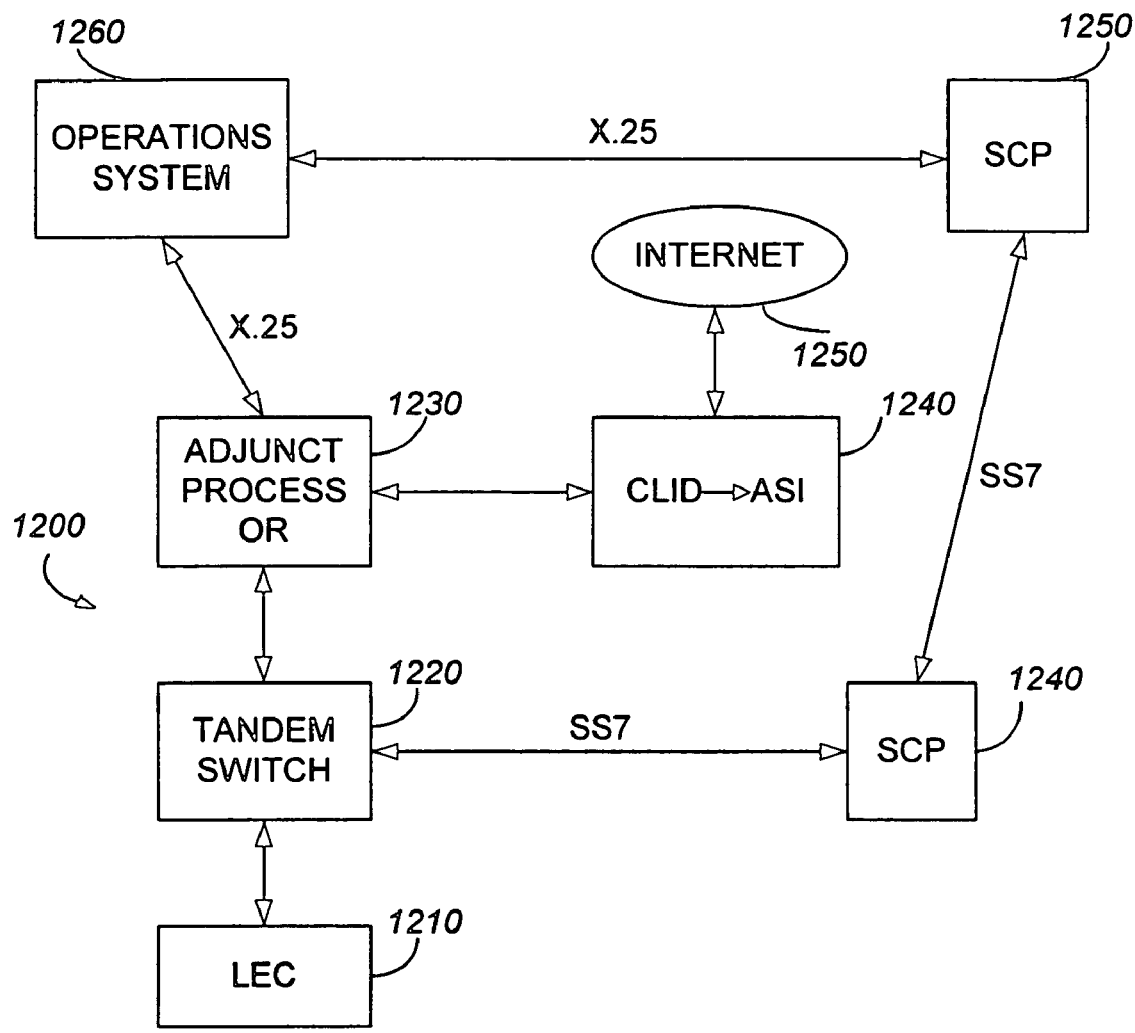
FIG. 12 is a block diagram of an inter-exchange carrier network architecture used to perform ANI to co-socket address database translations according to the present invention.

FIG. 12 illustrates an arrangement whereby the method 1100 and related methods may be implemented in a IXC network configuration 1200. A LEC 1210 is viewed by the IXC network 1200 as a signaling end point. The LEC is coupled to transfer SS7 call set-up and call termination packets to a tandem switch 1220. The tandem switch is an IXC long distance switch, also known as a class 4 switch. The tandem switch 1220 is coupled via an SS7 link to an adjunct processor (AP) 1230. The tandem switch 1220 may include an embedded service switching point which processes calls requiring database translations. The tandem switch 1220 is also coupled via an SS7 link to a signal transfer point (STP) 1240. An STP is a signaling node which acts as a hub for SS7 signaling messages. The STP is linked via an SS7 link to a service control point (SCP) 1250 which supplies database information to a set of network nodes. The network is controlled by an operations system 1260 which provides network management and other capabilities. The operations system 1260 is coupled normally by X.25 data links to the adjunct processor 1230 and the service control point 1250. In the embodiment shown, the adjunct processor 1230 contains an adjunct service point which responds to requests for service processing. This adjunct service point is coupled to a CLID-to/from internet address translation unit 1240 to provide automatic socket identification (ASI). The translation unit 1240 may optionally be coupled to an internet 1250 to provide a dynamic database of current internet addresses available for use as co-sockets and related purposes. In some embodiments the translation unit 1240 may be coupled to the SCP 1250.

Consider the operation of the network configuration 1200. A caller accesses the LEC 1210 via a subscriber loop. Supposing a long distance call is placed, an SS7 call set-up packet is routed from the LEC to the IXC. In which case, the LEC is viewed by the network 1200 as a signaling end point. When the SS7 packet reaches the tandem switch 1220, it is routed through an internal service switching point. In the illustrative embodiment, if the call is identified as requiring internet co-socket database translation services, the SSP may route at least part of the SS7 packet to either the adjunct processor 1230 or the service control point 1250 for database translation. In FIG. 12, the packet is routed to the adjunct processor 1230 for translation. In this embodiment, the IXC network node may implement the method 1100 or similar methods to provide internet co-socket information to a called end of a connection. Data may transfer from the common channel signaling SS7 network to the internet 1250 to facilitate the establishment of co-sockets using a dynamic database as discussed in connection with FIG. 10 and FIG. 11 above.

Figure 13:
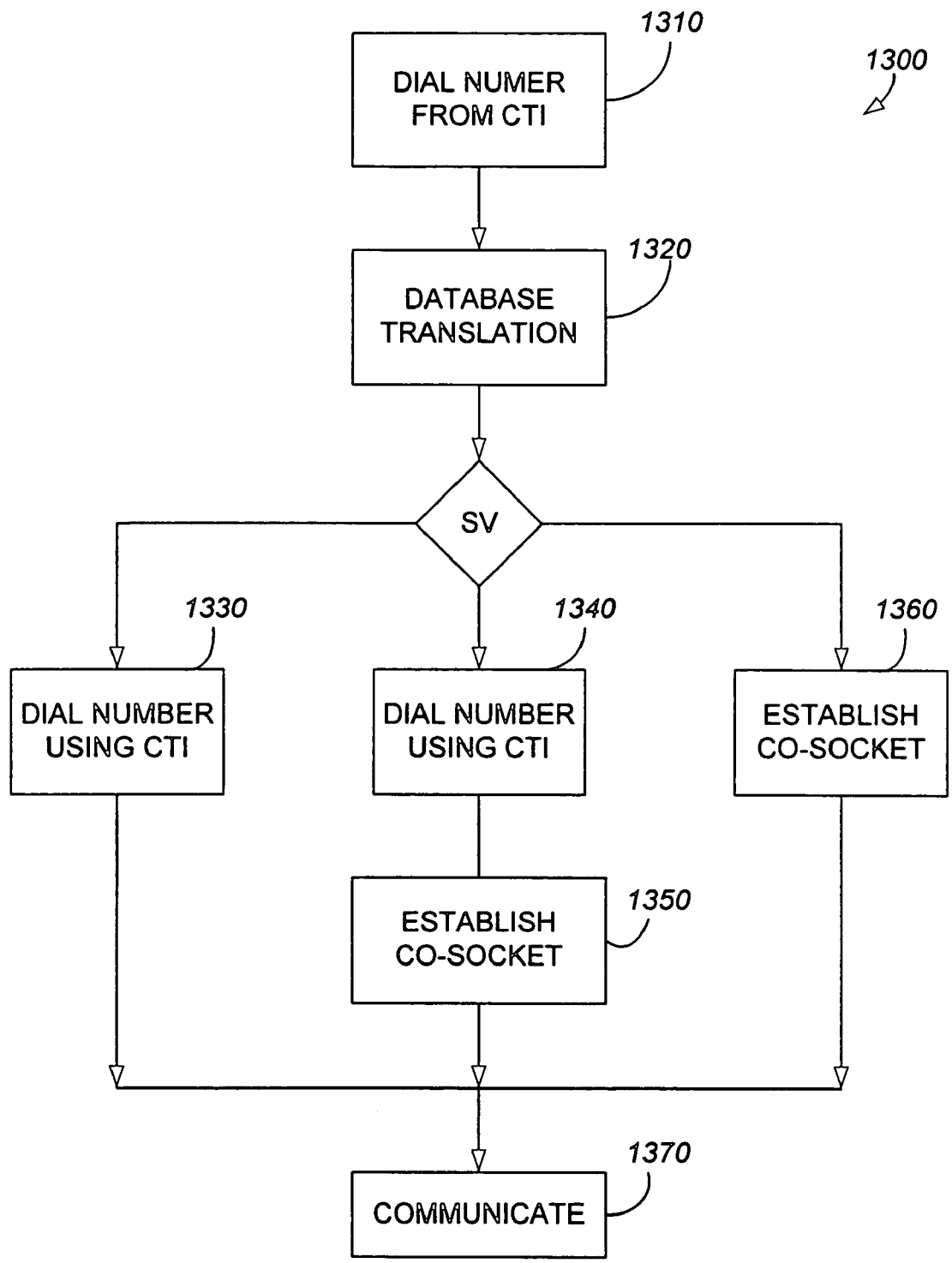
FIG. 13 is a flow chart illustrating a method of initiating the establishment of a co-socket by a calling device using an internet database approach.

Referring now to FIG. 13, a method 1300 is illustrated in flow chart form for establishing a co-socket without the need to transmit SYN segments over a telephone network. This method is practiced by the smart telephone 115 in the present embodiment; however, it can be appreciated that other types of devices may utilize the method with equal success. In a first step 1310, a phone number is dialed or retrieved for automatic dialing from a calling list. Control is then passed to a second step 1320 which performs a database translation to convert the telephone number into an internet address. As illustrated in FIG. 1, a database used to perform the translation is located in the local storage unit 165. Alternatively, the database may be located in the remote internet database server 112, or other locations based on the specific application. Depending on the information returned by the database search, a state variable (SV) is set. In some embodiments this state variable may be hard-wired, or different control flow logic may be employed. In the illustrative embodiment of the method 1300, depending on the value of the state variable, control passes from the second step 1320 to either a third step 1330, a fourth step 1340, or a sixth step 1360. If SV is in a first position, control passes from the second step 1320 to the third step 1330. In the third step 1330, a telephone number is dialed to establish a point-to-point PSTN or PBX telephone connection with the called party. Control then passes from the third step 1330 to a seventh step 1370 where communication with the distant end occurs. In this case communication is via the point-to-point PSTN or PBX telephone connection established in the third step 1330. This control path is typically executed if no database match is found or if the database supplies information indicating no co-socket address is available for the called number.

Alternatively, if the state variable is in a second position, control passes from the second step 1320 to the fourth step 1340. In the fourth step 1340, a telephone number is dialed to establish a point-to-point telephone PSTN connection with the callee. Control passes from the fourth step 1340 to the fifth step 1350 where an internet co-socket is established by sending SYN segments across an internet. Note that the fourth step 1340 and the fifth step 1350 may be executed in any sequence or in parallel. Control now passes from the fifth step 1350 to a seventh step 1370 where communication with the distant end occurs. In this case communication is via both a point-to-point PSTN telephone connection and an internet co-socket. This control path is useful for establishing multimedia links using a point-to-point PSTN telephone connection and an internet co-socket.

If SV is in a third position, control passes from the second step 1320 to the sixth step 1360. In the sixth step 1360, an internet connection is established by sending SYN segments across an internet. Alternatively, datagrams may be sent without establishing a TCP stream socket. Control passes from the sixth step 1360 to the seventh step 1370 where communication with the distant end occurs. In this case communication is via an internet connection only. This control path is useful for establishing an internet link to an internet call center such as the call center 140 accessible via the CTI server 100. It may also be used to reach a web page by dialing a telephone number from a smart phone. If the number is dialed from a non-smart phone a CTI server may be reached. If the number is dialed from a smart phone, a graphical interface can be reached. The method 200 previously discussed may be used to obtain a call-back from the call center at a later time in this form of co-socket telephony. No voice connection is initially needed. An alternative use is to establish an H.323 link if the database translates the PSTN telephone number into a packetized connection telephone number.

Figure 14:
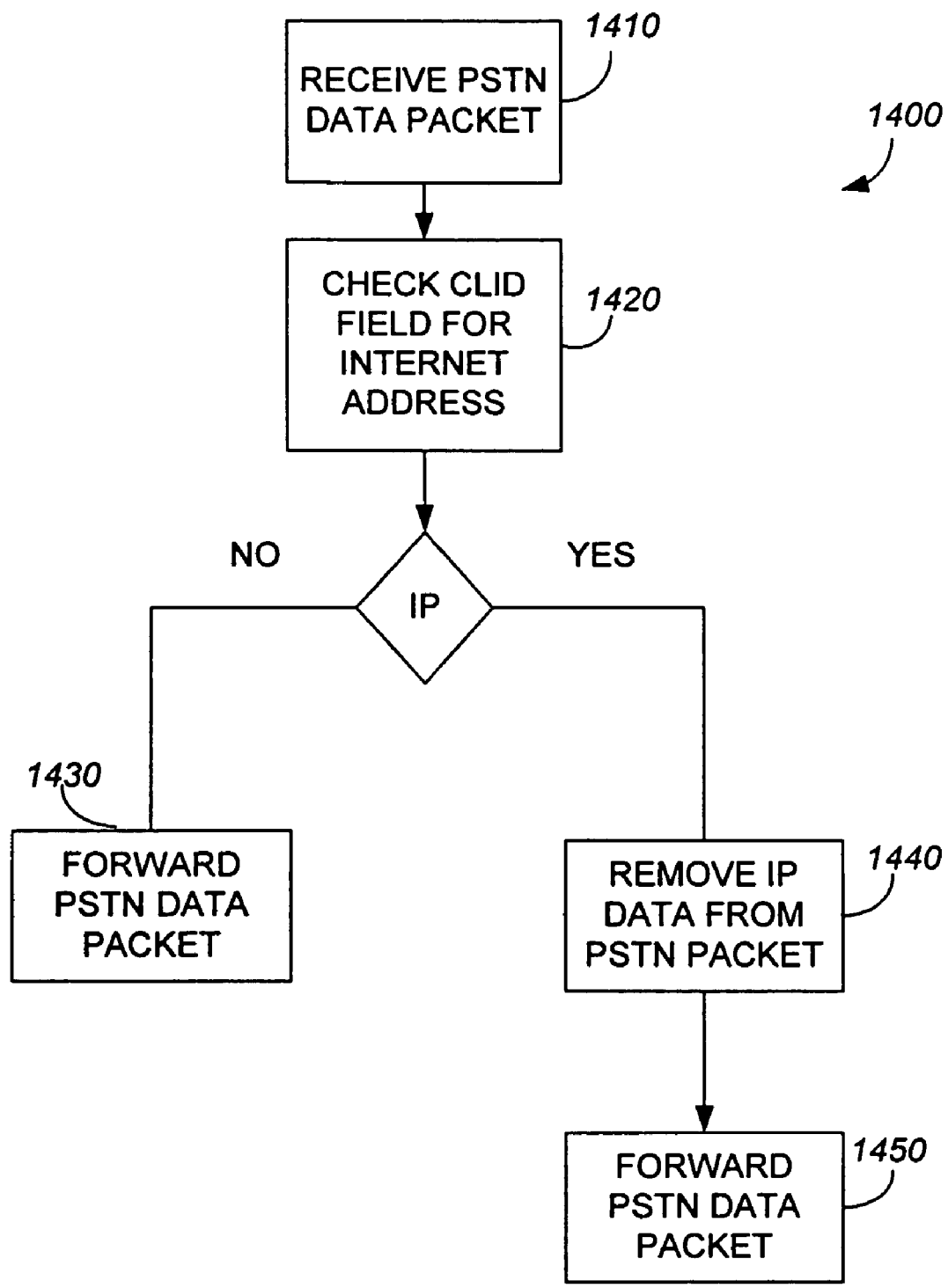
FIG. 14 is a flow chart illustrating a method of removing internet address data from PSTN data packets according to the present invention.

FIG. 14 illustrates a method 1400 of removing internet socket address information from an SS7 call set-up packet. In a first step 1410, a PSTN data packet is received. For example, this step may be carried out in a switching service point within the tandem switch 1220. Control next passes to a second step 1420 which preferably checks the PSTN data packet for internet address information embedded into the CLID portion of the packet. If no internet address information is found, control transfers to a third step 1430. The third step 1430 forwards the PSTN data packet for further processing and transmission. Alternatively, if an internet address is found in the second step 1420, control passes to a fourth step 1440 which is operative to remove the internet information from the data packet. This fourth step may be performed by adjunct processor 1230, for example, built around an Intel Pentium™ processor or other such device. Once the internet address information is removed, control transfers to a fifth step 1450 which is operative to forward the packet for further processing and transmission. This method is advantageous to an IXC whom does not want to pass traffic which may be useful to internet competitors.

Although the present invention has been described with reference to specific embodiments, other embodiments may occur to those skilled in the art without deviating from the intended scope. For example, any of the methods disclosed herein may be modified using different control variables and/or different sequencing of steps while achieving similar results. Also, while certain methods were described in the context of a PSTN, they may also be practiced using Internet telephony connections. Additionally, any number of different hardware, firmware, and software combinations may be employed to embody the apparatus disclosed herein. Therefore, it is to be understood that the invention herein encompasses all such embodiments which do not depart from the spirit and scope of the invention as defined in the appended claims.

What is claimed is:

1. A first computerized device configured to place a telephone call via a circuit switched telephone network to a second computerized device, comprising:
   a telephone subscriber interface to be coupled to the circuit switched telephone network;
   a computer readable medium that stores instructions;
   a set of digital circuits that includes a processor, wherein the processor executes the instructions to enable the set of digital circuits to cooperatively function to:
      cause a set of telephone dialing digits to be coupled via the telephone subscriber interface to the circuit switched telephone network to cause a circuit-switched telephone call to be placed to the second computerized device, wherein a circuit-switched telephone connection is established to couple into communication the first and second computerized devices;
      cause a data packet to be sent to the second computerized device by coupling from the first computerized device, an indication of the telephone dialing digits used to establish the circuit-switched telephone connection, to a remote server that determines an address of the second computerized device based upon the indication of the dialing digits, wherein the address is used to set up a packet switched data connection between the first and second computerized devices; and
      cause data to be communicated from the first computerized device to the second computerized device utilizing the packet switched data connection;
   wherein the packet switched data connection is established via a packet switched transmission path that is different than a circuit-switched transmission path over which the circuit-switched telephone connection is established, and wherein at least one of the computerized devices is a user computerized device with a user interface, and the packet switched data connection is used to carry application layer data for presentation to a user via the user interface while the circuit-switched telephone call is in progress between the first computerized device and the second computerized device.

2. The first computerized device of claim 1, further comprising:
   a digital video camera; and
   wherein the first computerized device is a wireless telephone, the second computerized device is a wireless telephone, the address is an application layer address, and the packet-switched data connection is used to transfer digital video data captured by the digital video camera.

3. The first computerized device of claim 1, wherein the address comprises an application layer address.

4. The first computerized device of claim 3, further comprising a digital camera, and wherein the first computerized device is a wireless telephone, the second computerized device is a wireless telephone, and the packet-switched data connection is used to transfer digital picture data captured by the digital camera.

5. The first computerized device of claim 3, further comprising a digital video camera, and wherein the first computerized device is a wireless telephone, the second computerized device is a wireless telephone, and the packet-switched data connection is used to transfer digital video data captured by the digital video camera.

6. The first computerized device of claim 3, further comprising a user input device and a graphical user interface, and wherein the first computerized device is a wireless telephone, the second computerized device is a wireless telephone, and the packet-switched data connection is used to transfer real-time textual application sharing data.

7. The first computerized device of claim 1, wherein the telephone subscriber interface comprises a voice channel of a wireless air interface, and both the circuit-switched telephone connection and the packet data connection are multiplexed for communication via the wireless air interface.

8. The first computerized device of claim 1, wherein the first computerized device implements a client-side application program communication protocol and the second computerized device implements a server-side application program communication protocol.

9. The first computerized device of claim 1, wherein the first computerized device implements a server-side application program communication protocol and the second computerized device implements a client-side application program communication protocol.

10. The first computerized device of claim 1, wherein the telephone subscriber interface comprises a voice channel of a wireless air interface, and both the circuit-switched telephone connection and the packet data connection are multiplexed for communication via the wireless air interface.

11. The first computerized device of claim 1, wherein the address comprises a session layer address.

12. The first computerized device of claim 1, wherein the address comprises a transport layer address.

13. The first computerized device of claim 1, wherein the address comprises a network layer address.

14. The first computerized device of claim 1, wherein the address comprises an application layer address and the packet switched data connection comprises at least a path through the global ubiquitous Internet.

15. The first computerized device of claim 1, wherein the packet switched data connection comprises a TCP/IP stream socket established across the Internet.

16. The first computerized device of claim 1, wherein the packet switched data connection is established using a data segment that is a SYN segment in a TCP/IP connection setup sequence.

17. The first computerized device of claim 1, wherein the packet switched data connection is established using a data segment that is a SYN segment.

18. The first computerized device of claim 17, wherein the SYN segment comprises a packet switched network address defined in at least one protocol layer from the group consisting of the network layer, the transport layer, the session layer and the application layer.

19. The first computerized device of claim 1, wherein at least one of the first and second computerized devices is a smart telephone device.

20. A second computerized device for use in a system where a first computerized device initiates a telephone call via a circuit switched telephone network to the second computerized device, comprising;
    a telephone subscriber interface to be coupled to the circuit switched telephone network;
    a computer readable medium that stores instructions;
    a set of digital circuits that includes a processor, wherein the processor executes the instructions to enable the set of digital circuits to cooperatively function to:
        detect at the telephone subscriber interface an incoming telephone call generated in response to a set of telephone dialing digits coupled by the first computerized device to the circuit switched telephone network;
        responsive to the detection, cause the telephone subscriber interface to be placed into an off-hook state to establish a circuit switched telephone connection with the first computerized device;
        receive a data packet at the second computerized device, the data packet containing an address having been produced in response to an indication of the dialing digits used by the first computerized device to establish the circuit switched telephone connection;
        cause a packet switched data connection to be established with the first computerized device at least partially by using the address; and
        cause application layer data to be communicated between the first and second computerized devices via the packet switched data connection;
    wherein the packet switched data connection is established via a packet switched transmission path that is different than a circuit-switched transmission path over which the circuit-switched telephone connection is established, and wherein at least one of the first and second computerized devices is a user computerized device with a user interface, and the packet switched data connection is used to carry the application layer data for presentation to a user via the user interface while the circuit-switched telephone call is in progress between the first computerized device and the second computerized device.

21. The second computerized device of claim 20, further comprising:
    a digital video camera; and
    wherein the first computerized device is a wireless telephone, the second computerized device is a wireless telephone, the address is an application layer address, and the packet-switched data connection is used to transfer digital video data captured by the digital video camera.

22. The second computerized device of claim 20, wherein the address comprises an application layer address.

23. The second computerized device of claim 22, further comprising a digital camera, and wherein the first computerized device is a wireless telephone, the second computerized device is a wireless telephone, and the packet-switched data connection is used to transfer digital picture data captured by the digital camera.

24. The second computerized device of claim 22, further comprising a digital video camera, and wherein the first computerized device is a wireless telephone, the second computerized device is a wireless telephone, and the packet-switched data connection is used to transfer digital video data captured by the digital video camera.

25. The second computerized device of claim 22, further comprising a user input device and a graphical user interface, and wherein the first computerized device is a wireless telephone, the second computerized device is a wireless telephone, and the packet-switched data connection is used to transfer real-time textual application sharing data.

26. The second computerized device of claim 22, wherein the telephone subscriber interface comprises a voice channel of a wireless air interface, and wherein both the circuit-switched telephone connection and the packet data connection are multiplexed for communication via the wireless air interface.

27. The second computerized device of claim 20, wherein the first computerized device implements a client-side application program communication protocol and the second computerized device implements a server-side application program communication protocol.

28. The second computerized device of claim 20, wherein the first computerized device implements a server-side application program communication protocol and the second computerized device implements a client-side application program communication protocol.

29. The second computerized device of claim 20, wherein the telephone subscriber interface comprises a voice channel of a wireless air interface, and wherein both the circuit-switched telephone connection and the packet data connection are multiplexed for communication via the wireless air interface.

30. The second computerized device of claim 20, wherein the address comprises a session layer address.

31. The second computerized device of claim 20, wherein the address comprises a transport layer address.

32. The second computerized device of claim 20, wherein the address comprises a network layer address.

33. The second computerized device of claim 20, wherein the address comprises an application layer address, and the packet switched data connection comprises at least a path through the global ubiquitous Internet.

34. The second computerized device of claim 20, wherein the packet switched data connection comprises a TCP/IP stream socket established across the Internet.

35. The second computerized device of claim 20, wherein the packet switched data connection is established using a data segment that is a SYN segment in a TCP/IP connection setup sequence.

36. The second computerized device of claim 20, wherein the packet switched data connection is established using a data segment that is a SYN segment.

37. The second computerized device of claim 36, wherein the SYN segment comprises a packet switched network address defined in at least one protocol layer from the group consisting of the network layer, the transport layer, the session layer and the application layer.

38. The second computerized device of claim 20, wherein at least one of the first and second computerized devices is a smart telephone device.

39. A computerized system comprising:
a computer readable medium that stores instructions;
a set of digital circuits that includes a processor, wherein the processor executes the instructions to enable the set of digital circuits to cooperatively function to:
cause a set of telephone number dialing digits to be coupled at least indirectly to a telephone network, wherein the set of telephone number dialing digits identify a recipient telephony subscriber endpoint device, and to cause an outgoing communication to be sent from the computerized device, wherein the outgoing communication follows a route at least partially through the telephone network to the recipient telephony subscriber endpoint device based upon the telephone number dialing digits;
cause a data segment to be sent as a part of the outgoing communication to the recipient telephony subscriber endpoint device, wherein the data segment contains at least a packet switched network address used by the recipient telephony subscriber endpoint device to establish a packet switched data connection, wherein once the packet switched data connection is established, the packet switched data connection is at least indirectly coupled to an application layer program in the recipient telephony subscriber endpoint device; and cause a data packet to be sent to the recipient telephony subscriber endpoint device via the packet switched data connection;
wherein the packet switched data connection is established via a packet switched transmission path that is different than the route followed by the outgoing communication through the telephone network to the recipient telephony subscriber endpoint device based upon the set of telephone number dialing digits; and
wherein the telephone dialing digits are specified at a first telephony subscriber endpoint device by a first user.

40. The computerized system of claim 39, wherein the packet switched data connection is a session layer packet switched data connection and the data packet sent to the application layer program is an unsolicited data packet.

41. The computerized system of claim 40, wherein the packet switched data connection uses an acknowledged packet protocol.

42. The computerized system of claim 41, wherein the packet switched data connection comprises a TCP/IP stream socket connection.

43. The computerized system of claim 39, wherein the data packet sent to the application layer program is an unsolicited data packet.

44. The computerized system of claim 39, wherein the computerized system further comprises a telephony interface which is used to couple information to the public switched telephone network.

45. The computerized system of claim 39, wherein the recipient telephony subscriber endpoint device is a recipient wireless subscriber device, the telephone number dialing digits correspond to the telephone number used to reach the recipient wireless subscriber device from the public switched telephone network, and the recipient wireless subscriber device is configured to receive both PSTN data packets and packet switched data packets via a multiplexed wireless path that couples the recipient wireless subscriber device to a multiplexed wireless infrastructure side equipment that couples to both the public switched telephone network and a packet switched telephone network.

46. The computerized system of claim 45, wherein the data packet sent to the recipient wireless subscriber device carries application layer data that is coupled to a second user via a user interface provided by the recipient wireless subscriber device.

47. The computerized system of claim 39, wherein the outgoing communications path is a circuit switched voice band channel established in response to the recipient wireless subscriber device answering a telephone call.

48. The computerized system of claim 39, wherein the outgoing communication is a PSTN datagram whose destination is determined based at least partially upon the telephone number dialing digits.

49. The computerized system of claim 39, wherein at least one of the functions of the set of digital circuits is triggered in response to a user input entered by a second user into a user input device associated with the recipient telephony subscriber endpoint device, the first telephony subscriber endpoint device and the recipient telephony subscriber endpoint device each include at least a respective wireless handset, and the packet switched data connection is used to communicate real-time information between the first telephony subscriber endpoint device and the recipient telephony subscriber endpoint device, wherein the real-time information is a member of the group consisting of textual keystroke information, video information, digital picture information, and shared application program screen-output information.

50. The computerized system of claim 39, wherein at least one of the functions of the set of digital circuits is triggered in response to a user input entered by a second user into a user input device associated with the recipient telephony subscriber endpoint device in response to windowed information on a display device.

51. The computerized system of claim 39, wherein the data segment comprises a network layer address.

52. The computerized system of claim 39, wherein the data segment comprises a transport layer address.

53. The computerized system of claim 39, wherein the data segment comprises a session layer address.

54. The computerized system of claim 39, wherein the data segment comprises an application layer address.

55. The computerized system of claim 39, wherein the data segment is a SYN segment.

56. The computerized system of claim 55, wherein the SYN segment comprises the packet switched network address, and wherein the packet switched network address is defined in at least one protocol layer from the group consisting of the network layer, the transport layer, the session layer and the application layer.

57. The computerized system of claim 39, wherein the packet switched data connection is used to implement a client-server communication protocol whereby a client sends a request which is responded to by a server, and wherein the computerized system comprises the server.

58. The computerized system of claim 39, wherein the packet switched data connection is used to push at least one unsolicited data packet to the recipient telephony subscriber endpoint device.

59. The computerized system of claim 39, wherein the packet switched data connection is used to push at least one unsolicited data packet to the recipient telephony subscriber endpoint device, and wherein the recipient telephony subscriber endpoint device is a wireless device that couples to an infrastructure side equipment via a multiplexed wireless signal path.

60. The computerized system of claim 39, wherein the computerized system comprises a server, and wherein the server makes outbound circuit switched voice band calls.

61. The computerized system of claim 39, wherein the computerized system comprises a server, and wherein the server causes outbound PSTN datagrams to be routed to their destinations.

62. The computerized system of claim 39, wherein the computerized system is a smart telephone device.

63. The computerized system of claim 39, wherein the first telephony subscriber endpoint device is a wireless handset coupled at least partially via a wireless connection to the computerized system.

64. The computerized system of claim 39, wherein the recipient telephony subscriber endpoint device is a smart telephone device that is at least indirectly coupled to both the public switched telephone network and a packet switched network via a multiplexed subscriber line interface that comprises a voice telephony path and a DSL data path carried on a single subscriber telephone line.

65. The computerized system of claim 63, wherein the recipient telephony subscriber endpoint device is a wireless subscriber smart telephone device that is at least indirectly coupled to both the public switched telephone network and a packet switched network via a multiplexed subscriber wireless interface that provides multiplexed communication signal paths that respectively carry PSTN datagrams and data packets to be routed by the packet switched network, and the data packet sent to the recipient wireless subscriber device carries application layer data that is coupled to a second user via a user interface provided by the recipient wireless subscriber device.

66. The computerized system of claim 65, wherein the wireless subscriber smart telephone device is coupled via a wireless LAN to a remote handset that is in local wireless communication with the wireless subscriber smart telephone, so that the remote handset can communicate with the packet switched network via the multiplexed subscriber wireless interface.

67. The computerized system of claim 65, wherein the processor executes the instructions to cause the set of digital circuits to further cause an unsolicited data packet to be pushed to the wireless subscriber smart telephone device via the packet switched data connection.

68. The computerized system of claim 65, wherein the processor executes the instructions to cause the set of digital circuits to further cause a digital picture to be sent to the wireless subscriber smart telephone device via the packet switched data connection.

69. The computerized system of claim 65, wherein the processor executes the instructions to cause the set of digital circuits to further cause at least one data packet containing digital video to be sent to the wireless subscriber smart telephone device via the packet switched data connection.

70. The computerized system of claim 65, wherein the processor executes the instructions to cause the set of digital circuits to further cause an unsolicited data packet to be pushed to the wireless subscriber smart telephone device via the packet switched data connection, and wherein the computerized system comprises a server side computerized system.

71. The computerized system of claim 65, wherein the processor executes the instructions to cause the set of digital circuits to further cause a digital picture to be sent to the wireless subscriber smart telephone device via the packet switched data connection, and wherein the computerized system comprises a server side computerized system.

72. The computerized system of claim 65, wherein the processor executes the instructions to cause the set of digital circuits to further cause at least one data packet containing digital video to be sent to the wireless subscriber smart telephone device via the packet switched data connection, and wherein the computerized system comprises a server side computerized system.

73. The computerized system of claim 65, wherein the processor executes the instructions to cause the set of digital circuits to further cause at least one data packet containing at least a portion of a voice mail message to be sent to the wireless subscriber smart telephone device via the packet switched data connection and wherein the computerized system comprises a server side computerized system.

74. The computerized system of claim 65, wherein the processor executes the instructions to cause the set of digital circuits to further cause at least one data packet containing at least a portion of message stored in a multimedia messaging server to be sent to the wireless subscriber smart telephone device via the packet switched data connection, and wherein the computerized system comprises a server side computerized system.

75. A wireless subscriber telephony endpoint device that provides both a telephony connectivity and a packet data service connectivity by wirelessly coupling via a multiplexed wireless subscriber interface communication path to at least one wireless network access point that couples to separate telephony and packet switched networks, wherein the telephony network uses telephone dialing digits to identify subscriber telephony endpoints to which information is to be routed and the packet switched network supports at least network and transport communication protocol stack layers, and uses packet header information associated with one or more of the protocol stack layers to determine how a packet is to be routed to its destination, the wireless subscriber telephony endpoint device comprising:

a user interface capable of supporting user interactions;

a multiplexed wireless air interface to communicate with the at least one wireless network access point, wherein the multiplexed wireless air interface supports both the telephony connectivity and the packet data service connectivity;

a computer readable medium that stores instructions;

a set of digital circuits that includes a processor, wherein the processor executes the instructions to enable the set of digital circuits to cooperatively function to:

cause an incoming communication to be detected, wherein the incoming communication is directed to the wireless subscriber telephony endpoint device based upon a set of telephone number dialing digits designated by a first user at a first telephony subscriber endpoint device, the telephone number dialing digits identify the wireless subscriber telephony endpoint device on a wireless telephony network, and the incoming communication is routed at least partially via a route through the telephony network;

cause the incoming communication to be evaluated for the presence of a data segment, wherein the data segment contains at least an indication of a network address;

cause a packet switched data connection to be established by using at least partially the indication of the network address;

cause a data packet to be received via the packet switched data connection; and cause at least a portion of the data packet to be coupled to an application layer program;

wherein the packet switched data connection is established via a packet switched transmission path through the packet switched network, and wherein the packet switched transmission path is different than the route through the telephony network followed by the incoming communication to the wireless subscriber telephony endpoint device.

76. The wireless subscriber telephony endpoint device of claim 75, wherein the packet switched data connection is a session layer packet switched data connection and the data packet coupled to the application layer program is an unsolicited data packet.

77. The wireless subscriber telephony endpoint device of claim 76, wherein the packet switched data connection uses an acknowledged packet protocol.

78. The wireless subscriber telephony endpoint device of claim 77, wherein the packet switched data connection comprises a TCP/IP stream socket connection.

79. The wireless subscriber telephony endpoint device of claim 75, wherein the data packet coupled to the application layer program is an unsolicited data packet.

80. The wireless subscriber telephony endpoint device of claim 75, wherein the wireless subscriber telephony endpoint device further comprises a telephony interface which is used to couple information to the public switched telephone network.

81. The wireless subscriber telephony endpoint device of claim 75, wherein the wireless subscriber telephony endpoint device is a wireless subscriber smart telephone device adapted to receive both PSTN data packets and packet switched data packets via the multiplexed wireless subscriber interface communication path.

82. The wireless subscriber telephony endpoint device of claim 81, wherein the data packet carries application layer data to be coupled to a second user via the user interface.

83. The wireless subscriber telephony endpoint device of claim 75, wherein the set of digital circuits further cooperatively function to establish a circuit switched voice band channel in response to the wireless subscriber telephony device answering an incoming telephone call, and an outgoing communication issued by the wireless subscriber telephony endpoint device is routed through a communications path that includes the circuit switched voice band channel.

84. The wireless subscriber telephony endpoint device of claim 75, wherein the incoming communication is a PSTN datagram carried on a PSTN datagram path whose destination is determined based at least partially upon the set of telephone number dialing digits.

85. The wireless subscriber telephony endpoint device of claim 75, further comprising a user input device, and wherein at least one of the functions of the set of digital circuits is triggered in response to a user input entered by a second user into the user input device.

86. The wireless subscriber telephony endpoint device of claim 75, further comprising a user input device and a display device, and wherein at least one of the functions of the set of digital circuits is triggered in response to a user input entered by a second user into the user input device in response to windowed information presented on the display device.

87. The wireless subscriber telephony endpoint device of claim 75, wherein the data segment comprises a network layer address.

88. The wireless subscriber telephony endpoint device of claim 75, wherein the data segment comprises a transport layer address.

89. The wireless subscriber telephony endpoint device of claim 75, wherein the data segment comprises a session layer address.

90. The wireless subscriber telephony endpoint device of claim 75, wherein the data segment comprises an application layer address.

91. The wireless subscriber telephony endpoint device of claim 75, wherein the data segment is a SYN segment.

92. The wireless subscriber telephony endpoint device of claim 91, wherein the SYN segment includes a packet switched network address defined in at least one protocol layer from the group consisting of the network layer, the transport layer, the session layer and the application layer.

93. The wireless subscriber telephony endpoint device of claim 75, wherein the packet switched data connection is used to implement a client-server communication protocol whereby a client sends a request which is responded to by a computerized device that acts as a server, and the first telephony subscriber endpoint device has communicated the telephone dialing digits at least partially via a wireless connection to the computerized device.

94. The wireless subscriber telephony endpoint device of claim 75, wherein the packet switched data connection is used to push at least one unsolicited data packet to the wireless subscriber telephony endpoint device.

95. The wireless subscriber telephony endpoint device of claim 75, wherein the packet switched data connection is used to pull at least one solicited data packet to the wireless subscriber telephony endpoint device.

96. The wireless subscriber telephony endpoint device of claim 75, wherein the first telephony subscriber endpoint device is a smart telephone device that comprises a server function, and wherein the server function makes outbound circuit switched voice band calls.

97. The wireless subscriber telephony endpoint device of claim 75, wherein the first telephony subscriber endpoint device is in communication with a server, and the server causes the incoming communication to be transmitted as one or more outbound PSTN datagrams.

98. The wireless subscriber telephony endpoint device of claim 75, wherein the first telephony subscriber endpoint device is a first wireless handset at least partially wirelessly coupled to a member of the group consisting of a smart telephone device and a computerized device that includes a server function.

99. The wireless subscriber telephony endpoint device claim 75, wherein the wireless subscriber telephony endpoint device is a wireless subscriber smart telephone device.

100. The wireless subscriber telephony endpoint device of claim 99, wherein the wireless subscriber telephony endpoint device is coupled via a wireless LAN to a remote handset that is in local wireless communication with the wireless subscriber telephony endpoint device, so that the remote handset can communicate with a packet switched network via the multiplexed subscriber wireless interface communication path.

101. The wireless subscriber telephony endpoint device of claim 99, wherein the processor executes the instructions to cause the set of digital circuits to further cooperatively function to:
cause to be processed an unsolicited data packet that was pushed to the wireless subscriber telephony endpoint device via the packet switched data connection.

102. The wireless subscriber telephony endpoint device of claim 99, wherein the processor executes the instructions to cause the set of digital circuits to further cooperatively function to:
cause a digital picture to be received at the wireless subscriber telephony endpoint device via the packet switched data connection.

103. The wireless subscriber telephony endpoint device of claim 99, wherein the processor executes the instructions to cause the set of digital circuits to further cooperatively function to:
cause at least one data packet containing digital video to be sent from the wireless subscriber telephony endpoint device via the packet switched data connection.

104. The wireless subscriber telephony endpoint device of claim 99, wherein the user interface enables World Wide Web (WWW) browsing.

105. The wireless subscriber telephony endpoint device of claim 99, further comprising a digital camera.

106. The wireless subscriber telephony endpoint device of claim 99, further comprising a digital video camera.

107. The wireless subscriber telephony endpoint device of claim 99, further comprising a digital scanner.

108. The wireless subscriber telephony endpoint device of claim 99, wherein the user interface comprises a graphical user interface that is configured to cause a screen to be popped for real-time multimedia communication with the first telephony subscriber endpoint device.

109. The wireless subscriber telephony endpoint device of claim 99,
wherein the user interface comprises a graphical user interface that is configured to cause a screen to be popped for real-time multimedia communication with a peer communication endpoint.

110. The wireless subscriber telephony endpoint device of claim 99, further comprising an application sharing program that supports the transmission of a digital picture from a local application program to a remote peer application program in a real-time interactive multimedia communications session.

111. The wireless subscriber telephony endpoint device of claim 99, further comprising an application sharing program that supports the transmission of a digital video motion image from a local application program to a remote peer application program in a real-time interactive multimedia communications session.

112. The wireless subscriber telephony endpoint device of claim 110, wherein the application sharing program further is configured to support the transmission of textual key strokes received by a local application program to be transmitted to a remote peer application program for display in a window on a remote peer device.

113. The wireless subscriber telephony endpoint device of claim 75, further comprising an application sharing program that supports the transmission of textual key strokes received by a local application program via a real-time packet data communications session to a remote peer application program for real-time display in a window on a remote peer device.

114. The wireless subscriber telephony endpoint device of claim 113, wherein a list of system users who are currently connected to the system with active connections is maintained in a dynamic database operated by an infrastructure side computerized system.

115. The wireless subscriber telephony endpoint device of claim 114, wherein the respective local and remote peer applications pop a screen of information onto respective display screens of the wireless subscriber telephony endpoint device and the remote peer device, to enable respective users to interact in real time using key strokes and at least one multimedia data source.

116. The wireless subscriber telephony endpoint device of claim 75, further comprising a digital camera, and wherein the processor executes the instructions to cause the set of digital circuits to further cause the wireless subscriber telephony endpoint device to transfer digital picture data captured by the digital camera via the packet switched data connection to a remote endpoint device.

117. The wireless subscriber telephony endpoint device of claim 75, further comprising a digital video camera, and wherein the processor executes the instructions to cause the set of digital circuits to further cause the wireless subscriber telephony endpoint device to transfer digital video data captured by the digital video camera via the packet switched data connection to a remote endpoint device.

118. The wireless subscriber telephony endpoint device of claim 75, further comprising a user input device, and wherein the user interface comprises a graphical user interface, and wherein the processor executes the instructions to cause the set of digital circuits to further cause the wireless subscriber telephony endpoint device to perform at least one of transmitting and receiving real-time textual application sharing data via the packet switched data connection.

119. The wireless subscriber telephony endpoint device of claim 75, wherein the processor executes the instructions to cause the set of digital circuits to further cause at least one data packet containing at least a portion of a voice mail message to be downloaded to the wireless subscriber telephony endpoint device via the packet switched data connection.

120. The wireless subscriber telephony endpoint device of claim 75, wherein the processor executes the instructions to cause the set of digital circuits to further cause at least one data packet containing at least a portion of message stored in a multimedia messaging server to be downloaded to the wireless subscriber telephony endpoint device via the packet switched data connection.

* * * * *